United States Patent [19]

Miyauchi et al.

[11] Patent Number: 4,868,720
[45] Date of Patent: Sep. 19, 1989

[54] ROAD SURFACE-SENSITIVE BEAM PATTERN LEVELING SYSTEM FOR A VEHICLE HEADLAMP

[75] Inventors: Shizuya Miyauchi; Kiyoshi Wada, both of Shimizu, Japan

[73] Assignee: Koito Seisakusho Co., Ltd., Shizuoka, Japan

[21] Appl. No.: 206,449

[22] Filed: Jun. 14, 1988

[30] Foreign Application Priority Data

Aug. 17, 1987 [JP] Japan .................. 62-203804

[51] Int. Cl.$^4$ .............. B60Q 1/10; B60Q 11/00; B62J 6/00
[52] U.S. Cl. ..................... 362/69; 362/71; 362/72; 362/287
[58] Field of Search .............. 362/66, 69, 71, 72, 362/285, 287, 429

[56] References Cited

U.S. PATENT DOCUMENTS

| | | | |
|---|---|---|---|
| 3,939,339 | 2/1976 | Alphen | 362/72 |
| 4,075,469 | 2/1978 | Alphen | 362/72 |
| 4,204,270 | 5/1980 | Poirier d'Ang d'Orsay | 362/71 |
| 4,223,375 | 9/1980 | Alphen | 362/72 |
| 4,237,524 | 12/1980 | Hundemer | 362/71 |
| 4,583,152 | 4/1986 | Kawai et al. | 362/71 |
| 4,620,267 | 10/1986 | Cibie | 362/66 X |
| 4,733,334 | 3/1988 | Krey | 362/71 |

FOREIGN PATENT DOCUMENTS

5618430 4/1981 Japan .

Primary Examiner—Ira S. Lazarus
Assistant Examiner—Richard R. Cole
Attorney, Agent, or Firm—Sughrue, Mion, Zinn, Macpeak & Seas

[57] ABSTRACT

A motorcycle headlamp capable of emitting a light beam with a beam pattern calculated to provide optimum forward illumination. In order to maintain the beam pattern in a level position about the lamp axis despite the lateral tipping of the motorcycle, at least one road sensor is employed for detecting the lateral angular position of the vehicle with respect to the road surface by transmitting radiation such as an ultrasonic wave or infrared rays toward the road surface and receiving its reflection from the road surface. Electric signals representative of lateral vehicle inclination are fed to a central processor unit, which then causes energization of a reversible electric motor built into the headlamp unit for leveling the beam pattern by revolving the bulb and control lens of the headlamp unit relative to the lamp housing. Thus, as the lateral angular position of the vehicle is detected in reference to the road surface, instead of to the perpendicular, the beam pattern can be maintained in the level position with respect to the road surface regardless of whether the road is banked or unbanked. Several different methods of detecting lateral vehicle inclination are disclosed.

17 Claims, 20 Drawing Sheets

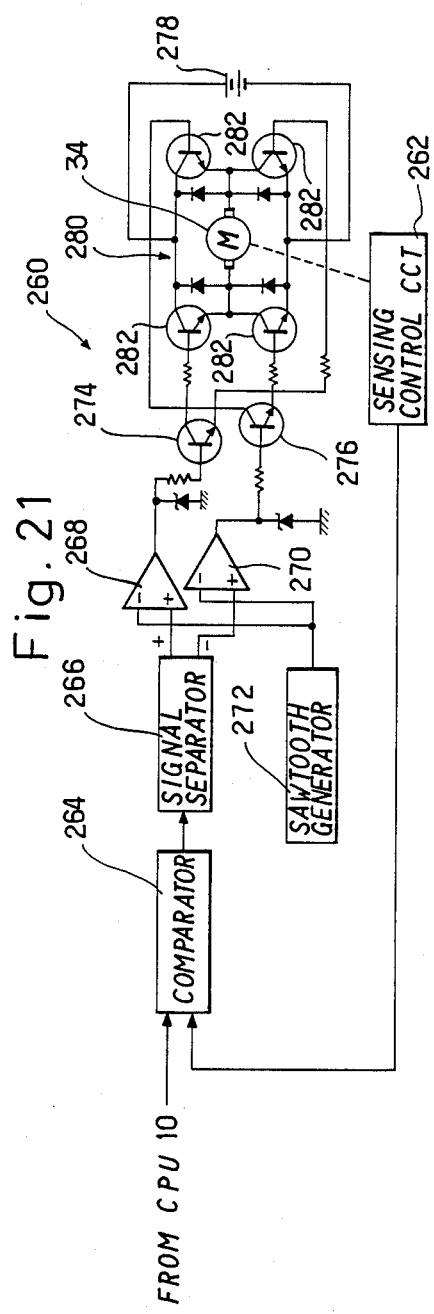
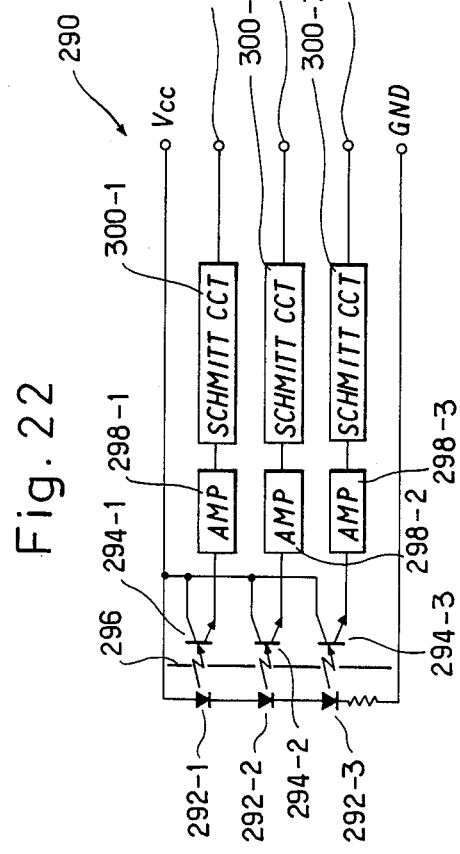

ROAD SURFACE-SENSITIVE BEAM PATTERN LEVELING SYSTEM FOR A VEHICLE HEADLAMP

BACKGROUND OF THE INVENTION

Our invention relates generally to vehicular headlamps and more specifically to those suitable for use on motorcycles or like vehicles that tilt laterally as when taking a curve or bend in a road. Still more specifically, our invention pertains to a system for use with such vehicular headlamps for automatically maintaining the pattern of the light beam, particularly the lower beam, thrown thereby in a level position about the beam axis in the face of variations in the lateral angle of the vehicle with respect to the road surface.

Vehicle headlamps today are usually constructed to provide the so called "upper beam" and "lower beam". The upper beam is intended primarily for distant illumination when the vehicle is not meeting or following other vehicles. The lower beam is intended to illuminate the road ahead of the vehicle when it is meeting or following another vehicle. The pattern or cross sectional shape of the lower beam, in particular, is definitely determined (see FIG. 10 of the drawing attached hereto) for the dual purpose of providing optimum road illumination for safe driving and of protecting other drivers from glare.

A problem has been encountered in connection with such two beam headlamps on motorcycles or like two wheeled vehicles. The vehicles of this class must tilt laterally when taking a curve or bend in a road, in order to avoid being centrifugally carried off the road or toppling over. As the vehicle tips in either of the opposite lateral directions, so does the pattern of the lower beam emitted by its headlamp. Thus angularly displaced from its level position, the lower beam pattern fails to perform its intended functions, illuminating the road either too close to, or too far away from, the vehicle, or not illuminating its lane at all, and possibly dazzling the drivers of oncomming vehicles.

Miyauchi et al. U.S. patent application Ser. No. 07/137,021, pending filed Dec. 22, 1987, represents an attempted solution to the above stated problem. This prior application teaches a motorcycle headlamp unit wherein the bulb and the control lens are rigidly interconnected for joint bidirectional rotation, within limits, about the lamp axis with respect to the lamp housing, thereby making possible the angular displacement of the beam pattern about the lamp axis. It also suggests a gyroscopic vehicle inclination detector for detecting the lateral, as well as longitudinal, tilting of the motorcycle with respect to the perpendicular. As an electric output signal of the detector indicates the lateral tilting of the vehicle in either direction, the interconnected bulb and control lens of the headlamp unit is revolved in the required direction to such an extent that the beam pattern is maintained level about the lamp axis despite the vehicle tipping.

We have found this known beam pattern leveling system unsatisfactory because of the use of the gyroscopic vehicle inclination detector. Operating gyroscopically, the prior art vehicle inclination detector can find the lateral vehicle angle with respect to the perpendicular and not to the road surface on which the vehicle is traveling. For this reason the known leveling system works well only as long as the vehicle is running on a road surface that is horizontal transversely. This limited workability has proved to be very inconvenient because road surfaces are not necessary horizontal in their transverse direction. Curves in highways in particular are usually banked; that is, they tilt laterally upward from the inside edge to the outside edge so as to help vehicles smoothly round the curves without the possibility of being centrifugally carried off the track.

Let us suppose that the motorcycle with the prior art beam pattern leveling system is taking a banked curve, with the vehicle laterally slanting out of the perpendicular and into right angular relationship with the roadbed. Since the vehicle is then at an angle to the perpendicular, the prior art system will detect this angle gyroscopically and correspondingly readjust the beam pattern into an angled position with respect to the bank. Such readjustment is unnecessary or, indeed, undesirable. The beam pattern should have stayed in the level position with respect to the slanting road surface, just as when the vehicle is running an unbanked road.

SUMMARY OF THE INVENTION

We have hereby succeeded in overcoming the noted weakness of the prior art and in providing a truly satisfactory beam pattern leveling system which is responsive to the lateral tipping of the vehicle with respect to the road surface rather than to the perpendicular.

Our invention may be summarized as a beam pattern leveling headlamp system for use on a motorcycle or like vehicle that is subject to lateral tipping as when taking a curve, comprising a headlamp unit on the vehicle for emitting a light beam having a prescribed beam pattern, the headlamp unit being capable of angularly displacing the beam pattern about the lamp axis. The headlamp unit is provided with beam pattern leveling means acting thereon for causing the headlamp unit to angularly displace the beam pattern about the lamp axis. The headlamp system further comprises vehicle inclination detector means sensitive to a road surface on which the vehicle is traveling, for detecting the degree of lateral tipping of the vehicle with respect to the road surface. In response to signals from the vehicle inclination detector means, control means actuates the beam pattern leveling means so as to cause the head lamp unit to angularly displace the beam pattern about the lamp axis to an extent necessary for leveling the beam pattern in the face of the lateral tipping of the vehicle out of the right angular relationship to the road surface.

According to more specific aspects of our invention, the vehicle inclination detector means comprises at least one road sensor which transmits some radiation, such as an ultrasonic wave or infrared rays, toward the road surface and which receives the reflection of the radiation from the road surface. One or two such road sensors may be employed in combination with the same number of angle sensor or sensors. By oscillating the road sensor or sensors transversely of the road while the vehicle is running, there can be obtained signals representative of the direction (either rightward or leftward) of the vehicle) and angle of the lateral tipping of the vehicle with respect to the road surface. Alternatively, a greater number of road sensors may be fixedly mounted to the vehicle in suitable arrangement for providing such signals.

Thus, as the lateral inclination of the vehicle is detected with respect to the road surface, instead of to the perpendicular, in accordance with our invention, the beam pattern can always be maintained in the level position required by the lateral angle between the vehicle and the road surface. We are using the term "level position" of the light beam in reference to the transverse angle of the road surface which, of course, is not necessarily horizontal. When the road is banked, the vehicle will naturally incline out of the perpendicular into right angular relation with the road surface. Then the beam pattern will be in the "level position" with respect to the road surface even though it will be at an angle to the horizon. Thus our invention will contribute materially to safe driving on both banked and unbanked roads in the nighttime through enhancement of forward visibility and reduction of glare.

The above and other features and advantages of our invention and the manner of realizing them will become more apparent, and the invention itself will best be understood, from a study of the following description and appended claims, with reference had to the attached drawings showing some preferable embodiments of the invention.

BRIEF DESCRIPTION OF THE DRAWINGS

FIG. 21 is a schematic electrical diagram, partly in block form, of the circuitry for controllably driving the reversible electric motor of the beam pattern leveling mechanism incorporated with the headlamp assembly of FIGS. 2-4;

FIG. 22 is a schematic electrical diagram, partly in block form, of the circuitry associated with the angle sensor used in any of the three different forms of the vehicle inclination detector shown in FIGS. 12-17;

DESCRIPTION OF THE PREFERRED EMBODIMENTS

1. General

We will now describe the road surface sensitive beam pattern leveling system of our invention in detail as adapted for use with a motorcycle headlamp. The general organization of the leveling system will become apparent from its block diagrammatic representation in FIG. 1. The leveling system has a central processor unit (CPU) or very small computer 10, commercially available in the form of a microprocessor on an integrated circuit chip, for performing the various processing and control functions hereinafter set forth. Connected to the CPU 10 is, first of all, a vehicle inclination detector 12 for detecting the lateral angular position of the vehicle with respect to the road surface and, if the vehicle is laterally inclined out of the right angular relation with the road surface, the direction and angle of the inclination. A beam pattern angle detector 14 is also connected to the CPU 10 for delivering thereto a signal representative of the actual lateral inclination of the beam pattern about the beam axis.

Figure 1:
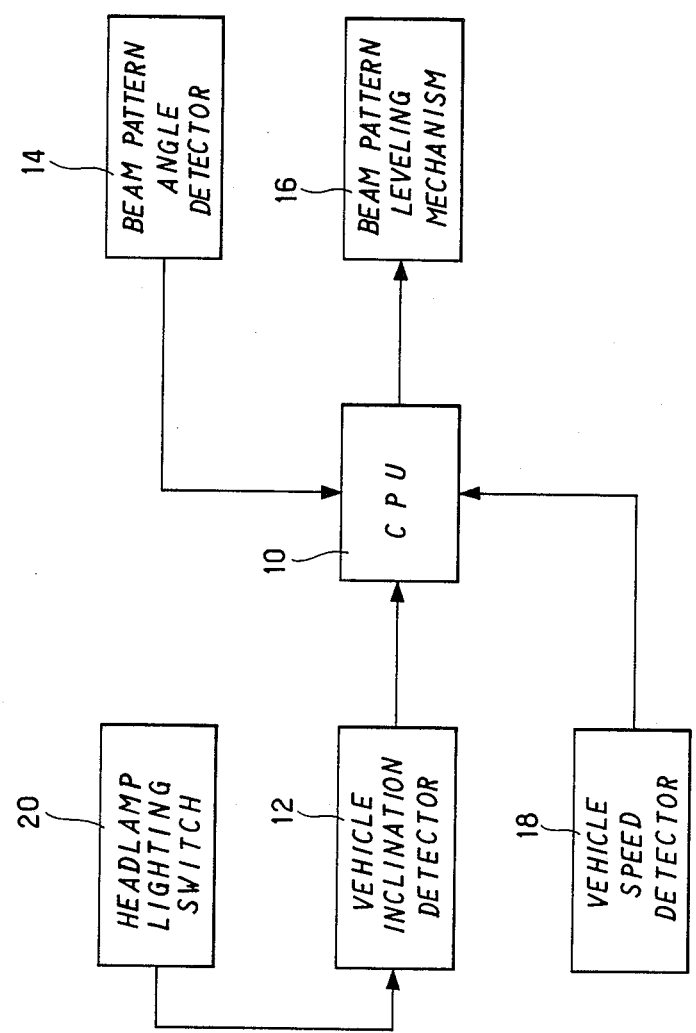
FIG. 1 is a block diagram showing the general configuration of the road surface sensitive beam pattern leveling system in accordance with our invention.

In response to the incoming signals indicative of the vehicle tilt and of the actual lateral beam pattern inclination, the CPU 10 activates, via a motor drive circuit which is not shown in FIG. 1, a reversible electric motor forming a part of a beam pattern leveling mechanism 16. When so energized, the beam pattern leveling motor will drive the required parts of the motorcycle headlamp for revolving the beam pattern about the lamp axis in such a direction, and through such an angle, that the beam pattern remains level with respect to the road surface despite the vehicle tilt.

A vehicle speed detector 18 of conventional design is also coupled to the CPU 10 for delivering thereto a signal suggestive of the traveling speed of the vehicle. The CPU 10 controls the operation of the beam pattern leveling mechanism 16 in order that the beam pattern may be angularly displaced to the level position at a speed matching the traveling speed of the vehicle. Shown connected to the vehicle angle detector 12 is a headlamp lighting switch 20 for turning the headlamp on and off. The complete beam pattern leveling system is to be electrically set into operation when the headlamp is lit up by the closure of the switch 20.

The following is a discussion in more concrete terms of a motorcycle headlamp assembly incorporating the beam pattern leveling system in accordance with the principles of FIG. 1. We will divide such discussion under several headings, with or without subheadings, for the ease of understanding.

2. Lamp Unit

2-1. Outline

Figure 2:
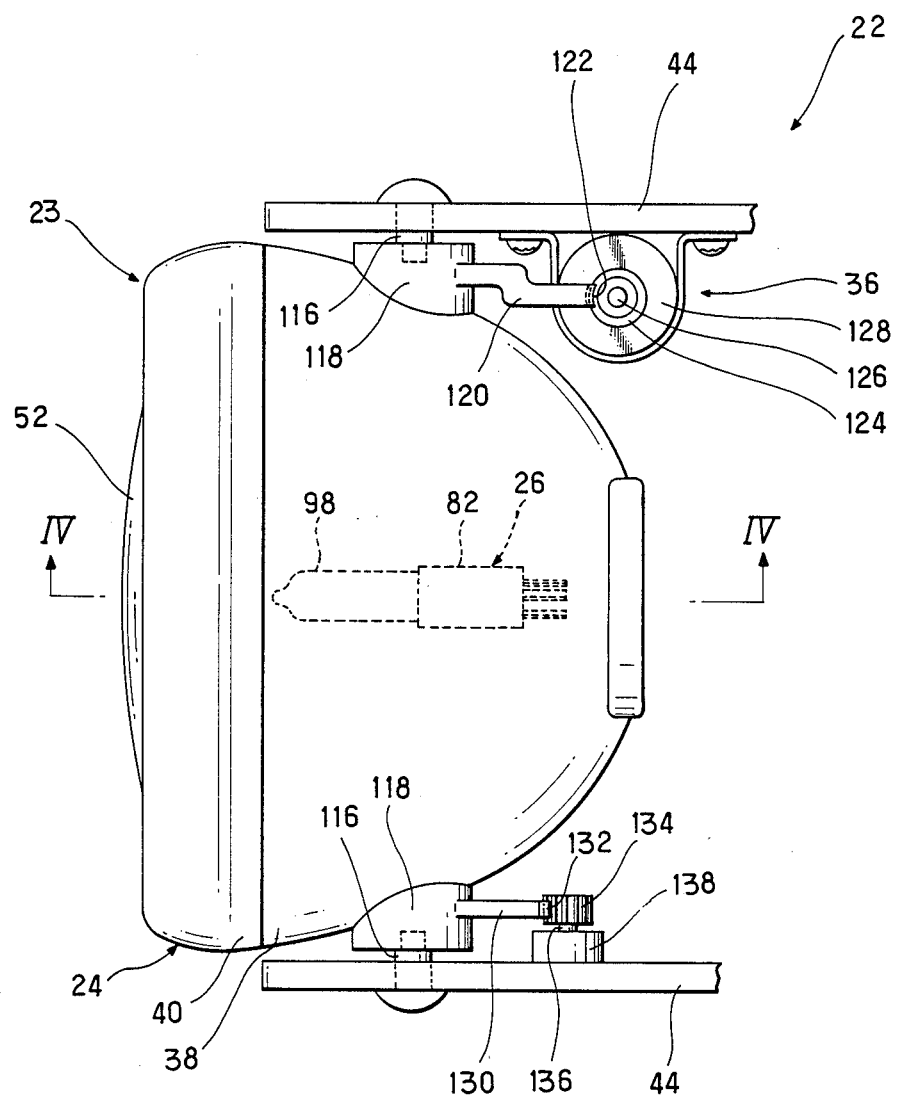
FIG. 2 is a top plan of the motorcycle headlamp assembly suitable for use with the beam pattern leveling system of our invention.
Figure 3:
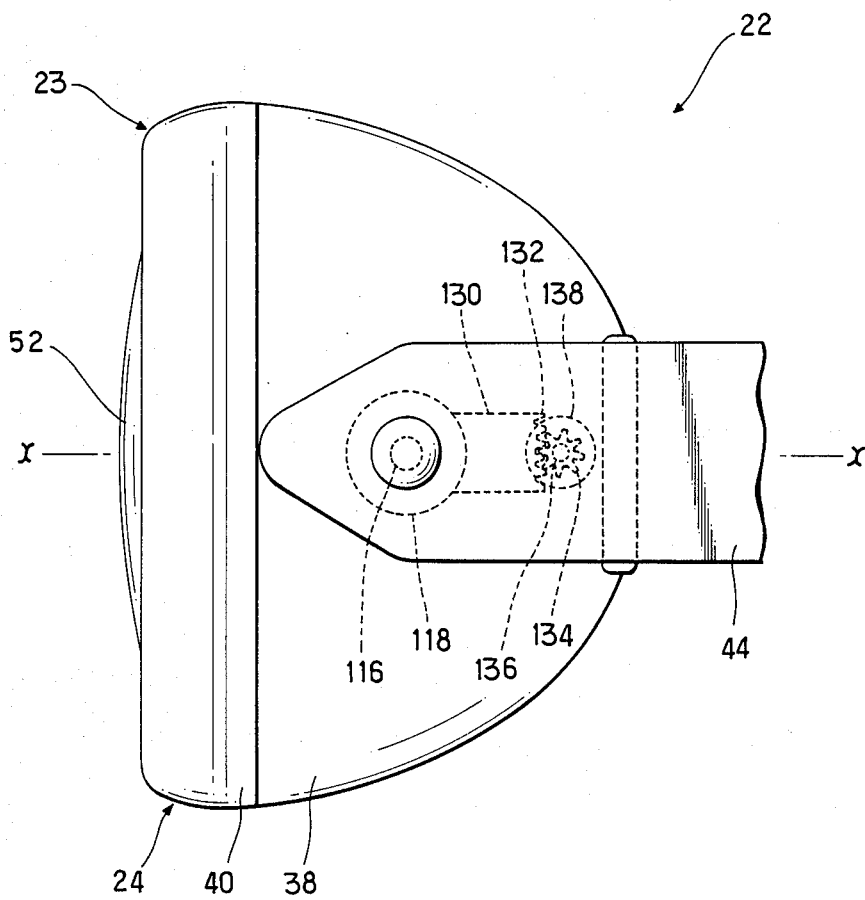
FIG. 3 is a side elevation of the headlamp assembly of FIG. 2.
Figure 4:
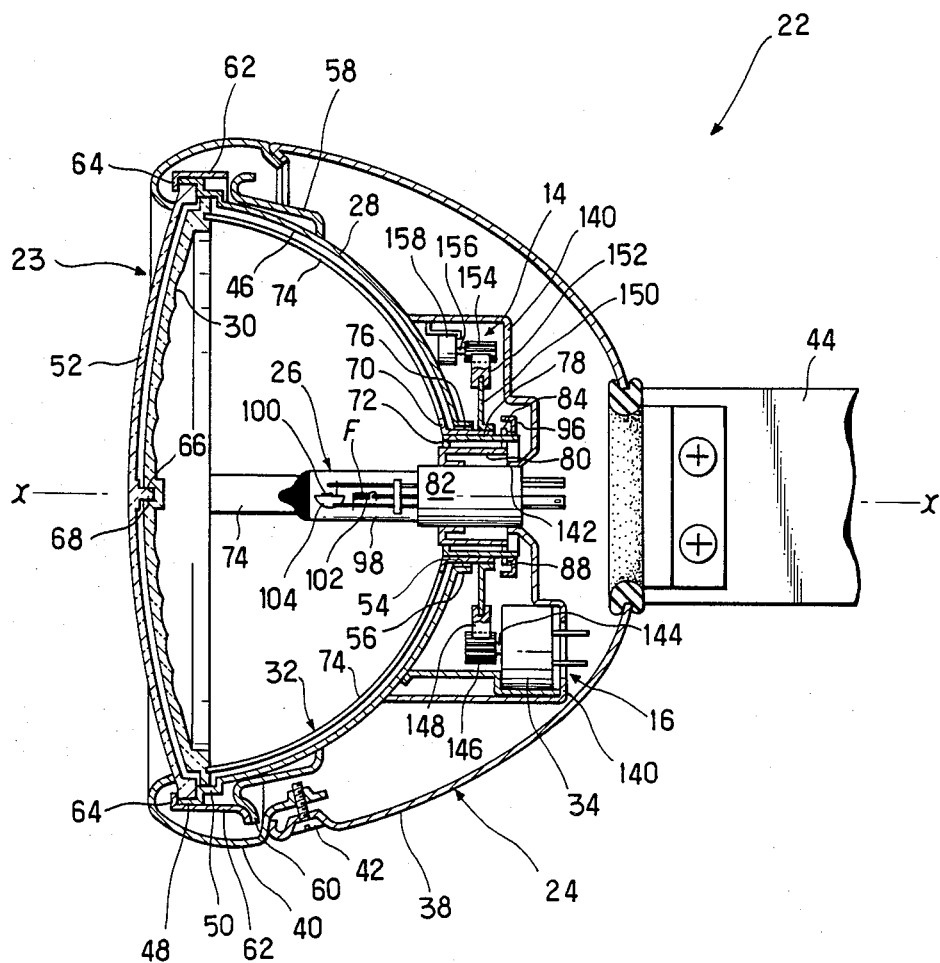
FIG. 4 is an axial section through the headlamp assembly, taken along the line IV—IV in FIG. 2.

As shown in FIGS. 2-4, the headlamp assembly 22 embodying our invention includes a lamp unit 23 having a lamp housing 24. Within this lamp housing 24 there are mounted a bulb or like light source 26, a paraboloidal reflector 28 and a control lens 30 in alignment about the lamp axis x—x. As better seen in FIG. 5, a metal made connector 32 rigidly interconnects the bulb 26 and the control lens 30 in prescribed relative angular positions about the lamp axis x—x. The interconnected bulb 26 and control lens 30 are jointly rotatable within limits in both directions about the lamp axis x—x with respect to the lamp housing 24 and reflector 28 for the lateral leveling of the pattern of the beam emitted by the lamp unit 23.

Figure 5:
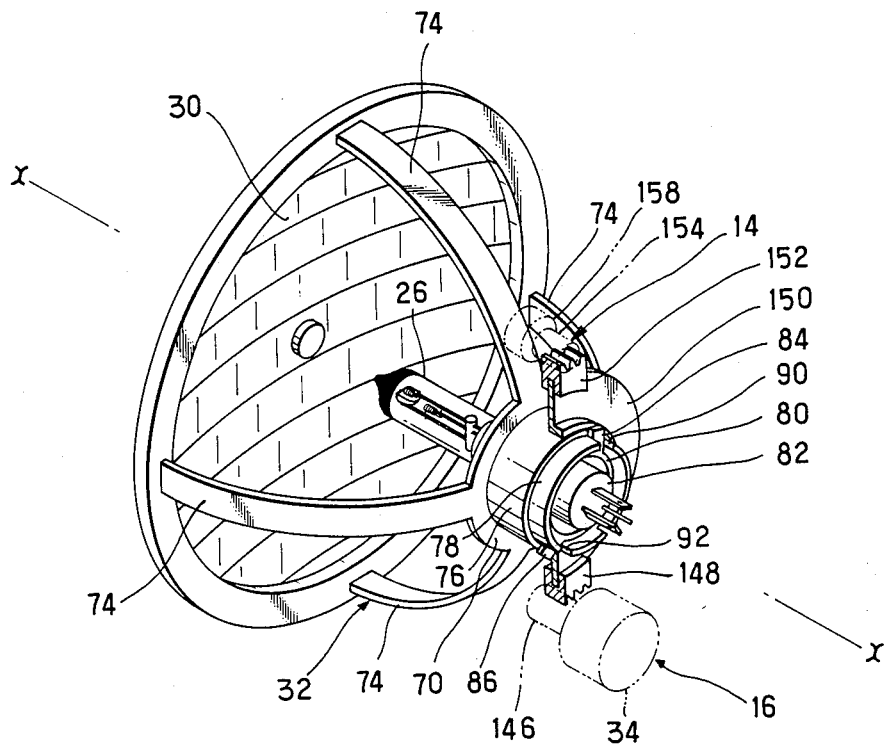
FIG. 5 is a perceptive view showing in particular the interconnected bulb and control lens of the headlamp assembly which are jointly rotatable relative to the lamp housing in order to revolve the beam pattern about the lamp axis.

Both FIGS. 4 and 5 reveal the noted beam pattern leveling mechanism 16, including a reversible electric motor 34, which is compactly accommodated in the space bounded between the lamp housing 24 and the reflector 28. We will refer to the motor 34 as the leveling motor in contradistinction from other motors to be set forth subsequently. The leveling mechanism 16 acts in this embodiment to bidirectionally revolve the bulb 26 and control lens 30 about the lamp axis x—x for maintaining the beam pattern in the level position with respect to the road surface despite the lateral tipping of the motorcycle. Seen in the same figures, the aforesaid beam pattern angle detector 14 functions to detect the lateral inclination of the beam pattern on the basis of the angular displacement of the bulb 26 and control lens 30 with respect to the nonrotatable parts of the lamp unit 23.

The headlamp assembly 22 further includes a vertical aiming adjustment mechanism 36, FIG. 2, for adjusting the aim or beam angle in the vertical plane. The aiming adjustment can be of any known or suitable construction and bears no direct pertinence to the beam pattern leveling system of our invention. Suffice it to say for the moment that the aiming adjustment mechanism 36 acts to pivot the lamp unit 23 about a horizontal axis extending transversely of the motorcycle in order to compensate for the possible tilting of the vehicle in its longitudinal direction with a change in the load thereon.

2-2. Lamp Housing

As shown in FIGS. 2-4, the lamp housing 24 may be described as being substantially bowl shaped, opening forwardly of the motorcycle to which the lamp assembly 22 is mounted. It comprises a bowl shaped major portion 38, and an annular rim 40 screwed or otherwise fastened as at 42, FIG. 4, to the front edge of the major portion so as to form a forward extension thereof. The major portion 38 of the lamp housing 24 is mounted between a pair of support arms 44 for pivotal motion about a horizontal axis extending transversely of the motor cycle, as will be later described in more detail in connection with the vertical aiming adjustment mechanism 36.

2-3. Reflector

Coaxially and immovably mounted within the lens housing 24 as in FIG. 4, the paraboloidal reflector 28 has a reflective surface 46 in the shape of a paraboloid of revolution. The front edge portion of the reflector 28 is formed to provide two concentric L shaped flanges 48 and 50 for supporting the control lens 30 and a cover lens 52 in a manner to be detailed presently. A circular opening 54 is formed concentrically in the rear end of the reflector 28. The edge of the reflector 28 bounding the opening 54 has an annular rim 56 protruding rearwardly therefrom. The bulb 26 concentrically extends through the reflector opening 54 and is supported in a manner set forth hereafter for rotation relative to the reflector 28.

2-4. Lens Mounting Means

As shown also in FIG. 4, a mounting ring 58 is fitted over the reflector 28 in the vicinity of its front end. The mounting ring 58 has a plurality of lugs 60, one seen, formed in one piece therewith at constant circumferential spacings. Disposed just forwardly of the mounting ring 58 is a retaining ring 62 which is firmly fitted over the flange 48 of the reflector 28. The retaining ring 62 has an inturned rim 64 for closely engaging the thickened periphery of the cover lens 52 between itself and the reflector flange 48. With the cover lens 52 so mounted in position, the retaining ring 62 is welded or otherwise affixed to the lugs 60 of the mounting ring 58, which in turn is secured to the rim 40 of the lamp housing 24 in any convenient manner. The lamp housing rim 40 is fastened as at 42 to its major portion 38 after the mounting ring 58 has been secured thereto. The cover lens 52 may be considered a part of the housing means comprising the lamp housing 24.

Disposed immediately behind or inside the cover lens 52, the control lens 30 has its periphery slidably engaged between the L shaped flange 50 on the reflector 28 and the periphery of the cover lens 52. The control lens 30 has a cylindrical recess 66 formed centrally therein for slidably receiving a cylindrical boss 68 on the cover lens 52. Thus the control lens 30 is rotatable relative to the reflector 28 and cover lens 52.

2-5. Connection between Bulb and Control Lens

The bulb 26 and the control lens 30 are rigidly interconnected as aforesaid by the metal made connector 32 for joint rotation about the lamp axis x—x with respect to the reflector 28 and cover lens 52. As best pictured in FIG. 5, the connector 32 has a disklike portion 70 which is centered about the lamp axis x—x and which has a hole 72, FIG. 4, formed centrally therein for concentrically surrounding the bulb 26. A plurality of, four in this embodiment, ribs 74 extend radially outwardly from the disklike portion 70 of the connector 32 at constant angular spacings. The connector ribs 74 are each gently curved to extend along the reflective surface 46 of the reflector 28 and have their extremities embedded in the thickened periphery of the control lens 30.

The connector 32 further includes a cylindrical portion 76 extending rearwardly from the edge of the disklike portion 70 bounding the hole 72. The cylindrical portion 76 protrudes rearwardly of the reflector 28 by rotatably extending through the hole 54 in the reflector. A bulb mounting sleeve 78 is concentrically received in the cylindrical portion 76 and partly extends rearwardly therefrom. The cylindrical portion 76 of the connector 32 and the bulb mounting sleeve 78 are rigidly interconnected as by welding. A bulb base sleeve 80 is concentrically nested in the bulb mounting sleeve 78.

Figure 6:
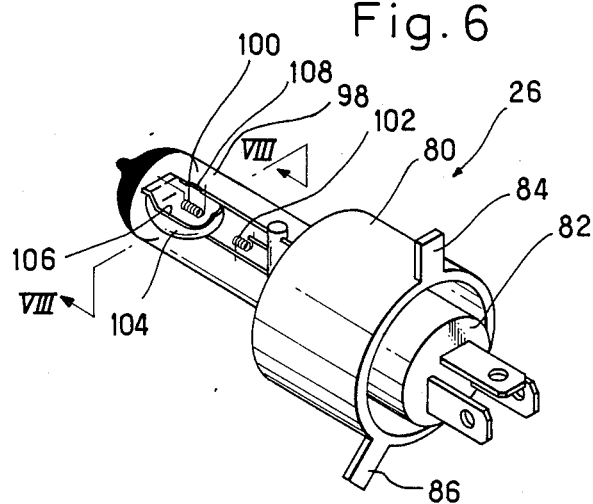
FIG. 6 is an enlarged perspective view of the bulb of the headlamp assembly.

As drawn on an enlarged scale in FIG. 6, the bulb base sleeve 80 coaxially surrounds the cylindrical base 82 of the bulb 26 and is welded or otherwise secured thereto. The bulb base sleeve 80 has a plurality of, three in this embodiment, positioning lugs 84, 86 and 88 extending radially outwardly from its rear end at constant angular spacings (lug 88 seen in FIG. 4). The lug 84, which is shown oriented upwardly in FIGS. 4–6, is wider than the other two lugs 86 and 88. These positioning lugs 84, 86 and 88 are engaged in recesses 90, 92 and 94, respectively, in the bulb mounting sleeve 78 (recess 94 indicated in FIG. 7). The recess 90 is made wider than the other two recesses 92 and 94 for engagement with the wider lug 84 on the bulb base sleeve 80. Thus the bulb 26 can be mounted to the connector 32 via the sleeves 78 and 80 in the correct angular position relative to the control lens 30 and connector 32 and further locked against angular displacement relative to the same. A bulb retainer 96, FIG. 4, retains the bulb 26 against axial displacement with respect to the connector 32. It is now apparent that the bulb 26 rotates with the control lens 30 and connector 32 about the lamp axis x—x relative to the reflector 28, cover lens 52 and so forth.

2-6. Light Source

Figure 8:
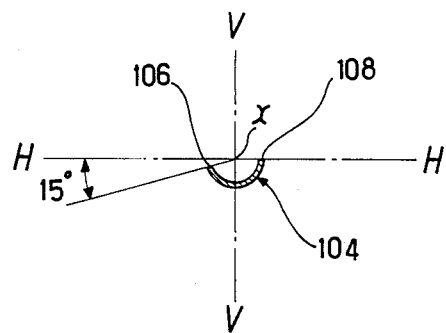
FIG. 8 is a transverse section through the shield cap of the bulb, taken along the line VIII—VIII in FIG. 6 and explanatory of how the lower beam of the desired pattern is emitted by the bulb.

With particular reference to FIG. 6 the light source of this headlamp unit 23 typically takes the form of the familiar double filament, halogen cycle incandescent bulb 26 for vehicular headlamp use. The bulb 26 has, in addition to the base 82, an envelope 98 of vitreous material within which there are coaxially mounted a lower beam filament 100 and an upper beam filament 102, with the former disposed forwardly of the latter. Also mounted within the envelope 98 is a shield cap 104 approximately in the shape of a dish shielding the lower half and front of the lower beam filament 100. The shield cap 104 has a pair of opposite side edges 106 and 108. FIG. 8 is explanatory of the relative angular positions of these side edges 106 and 108 of the shield cap 104 with respect to the lamp axis x when the wider positioning lug 84 on the bulb base sleeve 80 is oriented vertically upwardly. It will be noted that the left hand side edge 106, as seen in FIG. 8 which shows the shield cap 104 as viewed from the base end of the bulb 26, of the shield cap is located 15 degrees below the horizontal plane H—H containing the lamp axis x. The right hand side edge 108, on the other hand, of the shield cap 104 is located on the horizontal plane H—H.

When the bulb 26 is mounted in position within the lamp unit 23, as best depicted in FIG. 4, the upper beam filament 102 is positioned at the focus F of the reflector 28. The lower beam filament 100 is located slightly forwardly of the reflector focus F.

2-7. Beam Pattern

Figure 7:
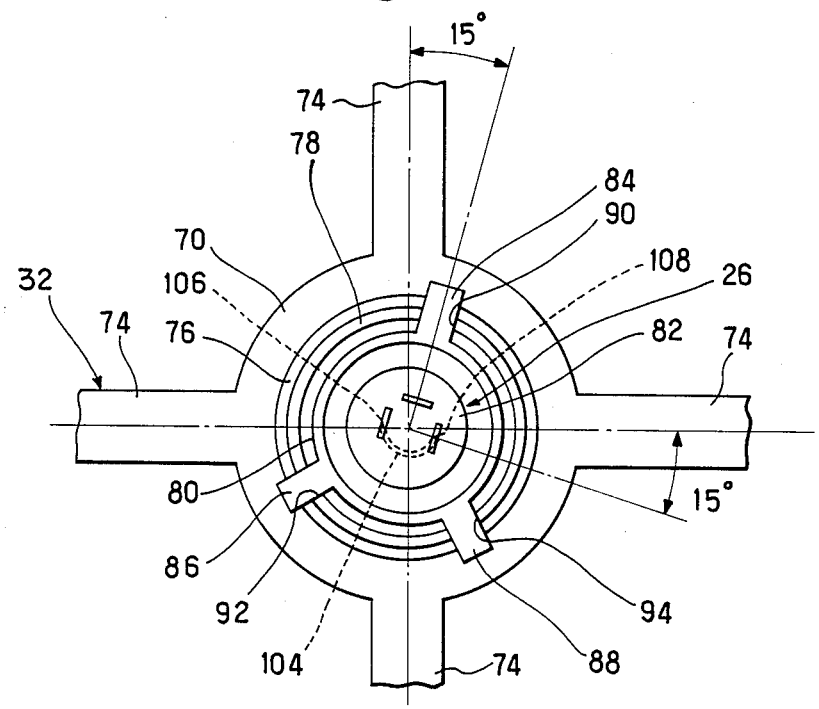
FIG. 7 is an enlarged end elevation of the bulb shown together with the connector, by which the bulb is connected to the control lens as best seen in FIG. 5, and means for mounting the bulb to the connector in the correct angular position about the lamp axis.

Let us suppose that the bulb 26 is in the angular position of FIG. 7 about the beam axis x—x. The wider positioning lug 84 is displaced 15 degrees in a clockwise direction from its vertical position, with the result that the left hand side edge 106 of the shield cap 104 is on the horizontal plane containing the lamp axis x—x whereas the right hand side edge 108 is 15 degrees below the horizontal plane.

Figure 9:
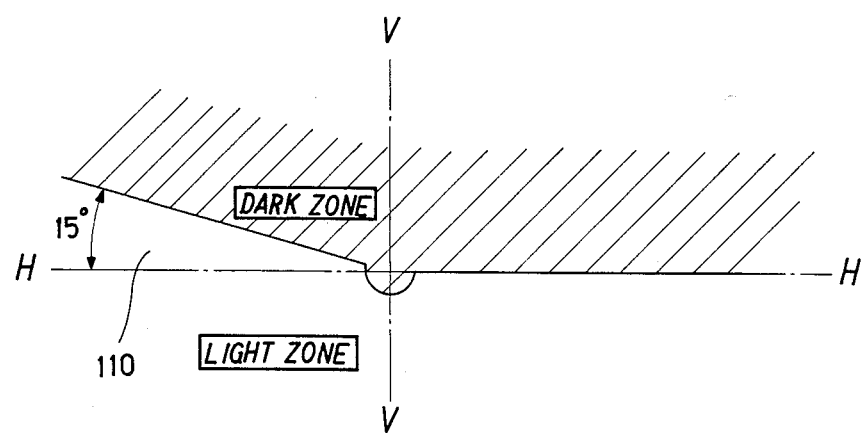
FIG. 9 is a diagram the lower beam pattern produced by the bulb having the shield cap of FIG. 8.

FIG. 9 shows the resulting distribution of the beam thrown by the lamp unit 23 when the lower beam filament 100 is lit up. The light zone includes an upwardly oriented region 110 which is located above the horizontal plane H—H containing the lamp (beam) axis and on the left hand side of the vertical plane V—V containing the beam axis. Further the upwardly oriented region 110 slants down the beam axis at an angle of 15 degrees. Part of the light rays that have been emitted by the lower beam filament 100 pass over the lower right hand side edge 108 of the shield cap 104, to be reflected by the lower part of the paraboloidal reflector 28. As has been stated, the lower beam filament 100 is positioned slightly forwardly of the focus F of the reflector 28. Consequently, on being reflected by the reflector 28, such light rays will be inverted both horizontally and vertically, thereby creating the upwardly oriented region 110.

Figure 10:
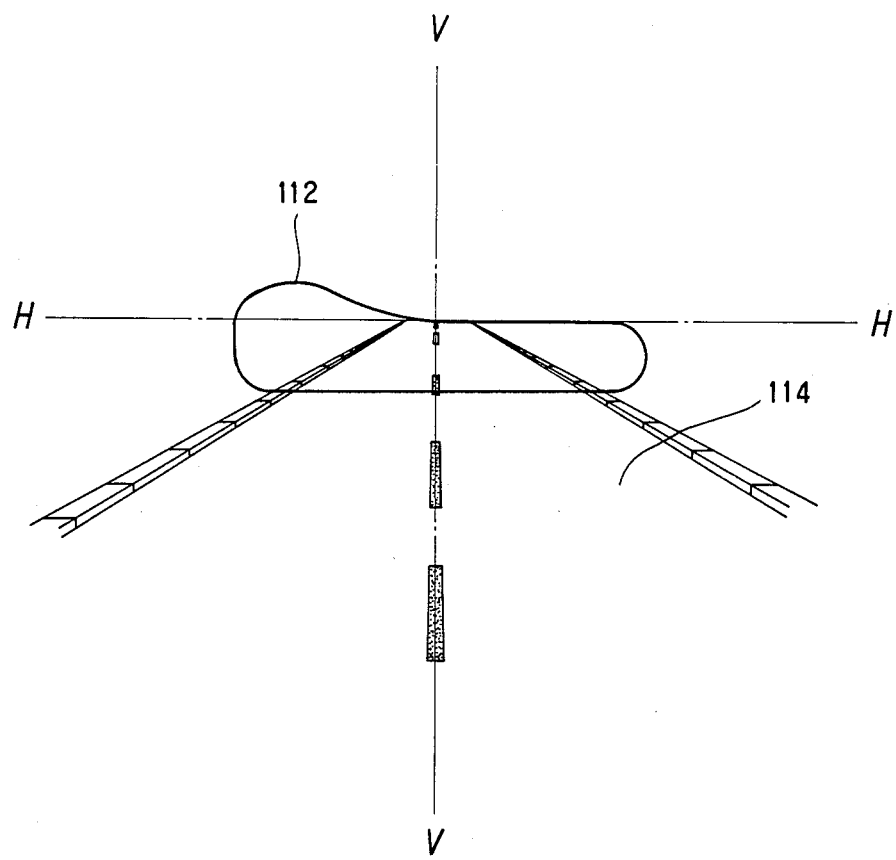
FIG. 10 is a more concrete illustration of the pattern of the lower beam emitted by the bulb, the lower beam pattern being shown as actually thrown on the road on which the motorcycle is traveling.

FIG. 10 is an illustration of the actual pattern 112 of the lower beam thrown as above by the lamp unit 23 when the vehicle is running over a road 114 in the normal vertical attitude. Our invention seeks to hold the beam pattern 112 in the illustrated "level position" with respect to the road surface, as defined already, despite the lateral tipping of the vehicle with respect to the road surface by turning the beam pattern about the beam axis at the intersection of the vertical plane V—V and the horizontal plane H—H.

3. Vertical Aiming Adjustment Mechanism

The vertical aiming adjustment mechanism 36, shown in FIG. 2 and in part in FIG. 3, constitutes no essential feature of our invention. We will therefore only briefly explain its construction and operation.

As will be understood from FIGS. 2 and 3, the lamp unit 23 comprising the lamp housing 24 and the various parts enclosed therein is supported between the pair of support arms 44 extending forwardly from the motorcycle frame, not shown here, in parallel spaced relation to each other. The support arms 44 have a pair of trunnions 116 extending toward each other in axial alignment about a horizontal axis extending transversely of the vehicle. The trunnions 116 are rotatably engaged with a pair of bosses 118 formed on the major portion 38 of the lamp housing 24. Thus the complete lamp unit 23 is pivotable relative to the motorcycle frame about the axis of the trunnions 116.

The upper one, as seen in FIG. 2, of the pair of bosses 118 has a rigid arm 120 extending rearwardly therefrom and having a set of worm teeth 122 on its end away from the boss. The worm teeth 122 mesh with a worm 124 on the upstanding armature shaft 126 of a reversible electric motor 128 clamped onto one of the support arms 44. We will refer to this motor 128 as the aiming motor. It is thus seen that the lamp unit 23 is pivotable up and down with the bidirectional rotation of the aiming motor 128.

As shown in both FIGS. 2 and 3, the other one of the pair of bosses 118 also has a rigid arm 130 extending rearwardly therefrom and having a set of gear teeth 132 on its end away from the boss. The gear teeth mesh with a gear 134 on a rotatable shaft 136 extending from a vertical aiming angle detector 138 secured to one of the support arms 44. The aiming angle detector 138 can be a potentiometer offering a variable amount of resistance with the rotation of the shaft 136.

In the operation of the vertical aiming adjustment mechanism 36 the lamp unit 23 will pivot in either direction about the axis of the trunnions 116 extending horizontally and transversely of the motorcycle upon rotation of the aiming motor 128. As the lamp axis x—x of the lamp unit 23 is thus varied vertically, so will the aim of the beam emitted thereby.

With such vertical tilting of the lamp unit 23 the toothed arm 130 on the lamp housing 24 will revolve the gear 134 on the rotatable shaft 136 of the aiming angle detector 138 through an angle corresponding to the angle of tilting of the lamp unit 23. Although we have not illustrated the detailed construction of the aiming angle detector 138 because of its familiarity, we understand that a sliding contact is mounted on the shaft 136 for joint rotation therewith in sliding engagement with a fixed resistive element, resulting in a change in the voltage between the terminals of the detector 138. This variable voltage, then, represents the vertical angle of the lamp unit 23.

4. Beam Pattern Leveling Mechanism

The beam pattern leveling mechanism 16, seen in both FIGS. 4 and 5, constitutes a part of the road surface sensitive beam pattern leveling system in accordance with our invention, which is to be discussed in detail throughout the rest of this specification.

FIG. 4 indicates that a common enclosure 140 for the beam pattern leveling mechanism 16 and the beam pattern angle detector 14 is rigidly mounted to the back of the reflector 28. The enclosure 140 is centrally apertured at 142 to permit part of the bulb 26 to extend rearwardly therethrough. Fixedly mounted within the enclosure 140 is the mentioned leveling motor 34 having its armature shaft 144 oriented parallel to the beam axis x—x. As shown also in FIG. 5, a drive gear 146 on the leveling motor shaft 144 meshes with a sector gear 148 secured to a rotatable disk 150. This rotatable disk is rigidly and concentrically mounted to the cylindrical portion 76 of the connector 32 interconnecting the bulb 26 and the control lens 30.

Thus, with the bidirectional rotation of the leveling motor 34, the intermeshing gears 146 and 148 will cause rotation of the disk 150 with the connector 32 and, in consequence, with the bulb 26 and the control lens 30 about the lamp axis x—x. Such combined angular displacement of the bulb 26 and control lens 30 will result in the lateral angular displacement of the beam pattern 112, FIG. 10, about the beam axis.

5. Beam Pattern Angle Detector

The beam pattern angle detector 14 is seen also in FIGS. 4 and 5. Housed in the enclosure 140, the beam pattern angle detector 14 includes a sector gear 152 mounted fast to the rotatable disk 150 on the cylindrical portion 76 of the connector 32. The sector gear 152 meshes with a driven gear 154 fixedly mounted on a rotatable shaft 156 coupled to a beam pattern angle sensor 158. We recommend an optical rotary encoder as the beam pattern angle sensor 158.

The beam pattern angle sensor 158 is driven from the rotary disk 150 via the intermeshing gears 152 and 154 upon angular displacement of the bulb 26 and control lens 30 about the lamp axis x—x under the action of the beam pattern leveling mechanism 16. Thus the electric output signal of the beam pattern angle sensor 158 represents the degree of angular displacement of the bulb 26 and control lens 30 in either direction about the lamp axis x—x and, therefore, the degree of lateral inclination of the beam pattern.

6. Vehicle Inclination Detector

Figure 11A:
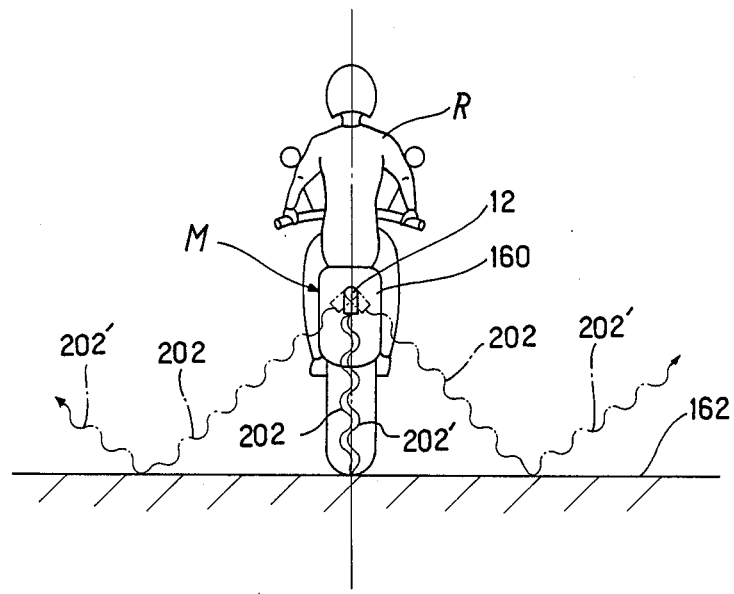
FIG. 11A is a end elevation of the motorcycle, together with a rider thereon, incorporating the beam pattern leveling headlamp system of our invention, the view being explanatory of how the lateral vehicle angle is detected with respect to the road surface when the vehicle is traveling in an upstanding attitude or at right angles with the road surface.
Figure 11B:
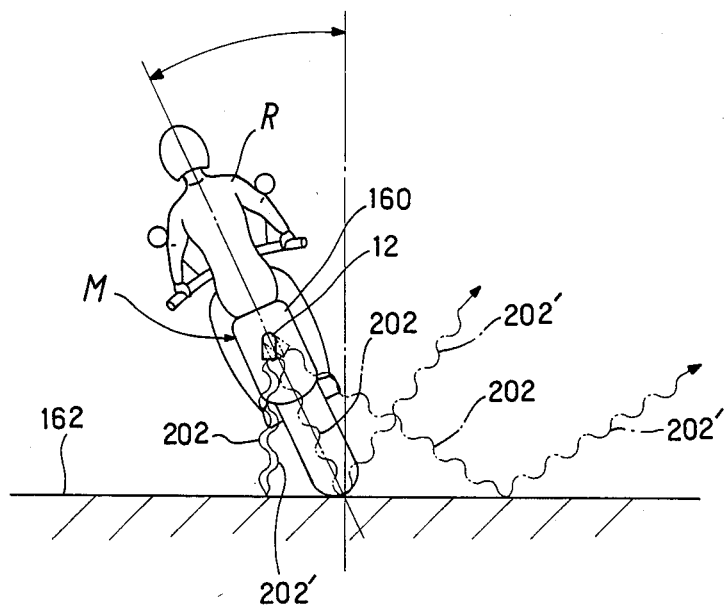
FIG. 11B is an illustration similar to FIG. 11A and explanatory of how the lateral vehicle angle is detected with respect to the road surface when the vehicle is running at an angle thereto.

As pictured in FIGS. 11A and 11B, which show the motorcycle M incorporating the headlamp assembly 22, together with a rider R thereon, the vehicle inclination detector 12 is mounted to the vehicle frame 160 in a position at or adjacent the midpoint of its transverse dimension. The vehicle inclination detector 12 functions to sense the direction and angle of the lateral inclination of the vehicle M with respect to the road surface 162. Since the vehicle inclination detector 12 can take several different forms in practice within the broad teaching hereof, we will describe such different forms one after another.

6-1. First Form of Vehicle Inclination Detector

Figure 12:
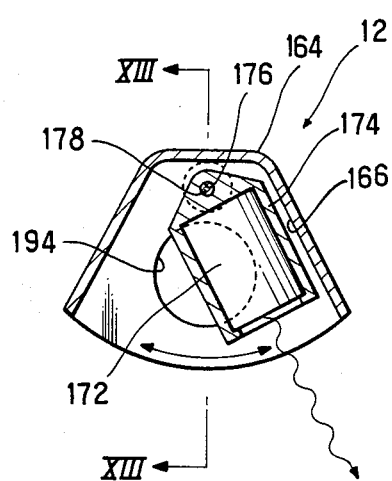
FIG. 12 is a section through the vehicle inclination detector, forming a part of the beam pattern leveling headlamp system of our invention, for detecting the lateral angle of the vehicle with respect to the road surface, the section being taken along a vertical plane transverse to the motorcycle to which the detector is mounted.
Figure 13:
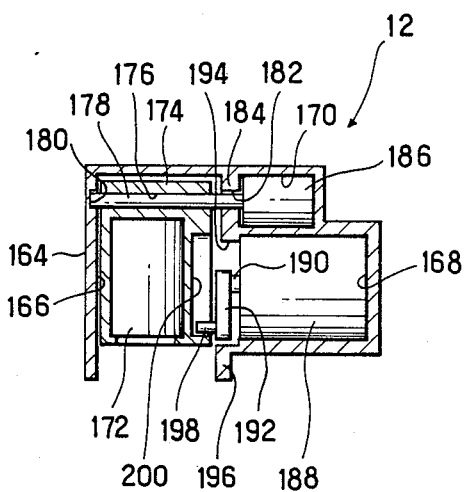
FIG. 13 is a section through the vehicle inclination detector of FIG. 12, taken along the line XIII—XIII in FIG. 12.

Seen at 164 in FIGS. 12 and 13 is a detector housing enclosing the various working components of the vehicle inclination detector 12 set forth subsequently. The detector housing 164 defines: (a) a road sensor chamber 166 of sectorial shape, as seen cross sectionally as in FIG. 12, opening downwardly; (b) a motor chamber 168 behind the road sensor chamber 166; and (c) an angle sensor chamber 170 above the motor chamber 168.

A road sensor 172 is closely received in an open bottom casing 174 which in turn is mounted in the road sensor chamber 166 for oscillation about a horizontal axis extending longitudinally, that is, in the traveling direction, of the motorcycle. The road sensor 172 comprises a transmitter of some form of radiation such as infrared rays or ultrasonic wave, and a receiver for receiving the reflection of the radiation from the road surface 162, together with associated electric circuitry, as will be later described in more detail. Constantly oscillated while the motorcycle M is running with the headlamp glowing, the road sensor 172 laterally scans the road surface with the radiation. The radiation receiver produces an electric signal representative of the magnitude of the received reflection, if any, of the radiation.

Figure 14:
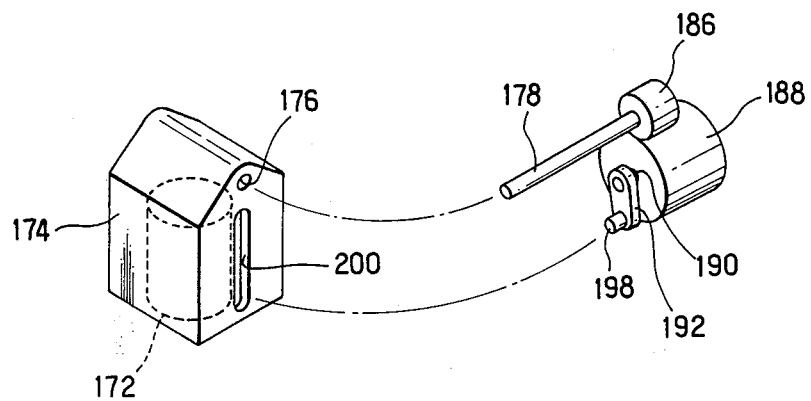
FIG. 14 is an exploded perspective view of the road sensor, angle sensor, and road sensor drive motor included in the vehicle clination detector of FIGS. 12 and 13.

As shown also in FIG. 14, the road sensor casing 174 has a hole 176 extending horizontally therethrough, in which there is pressfitted a rotary shaft 178 having one of its ends rotatably engaged in a bearing hole 180, FIG. 13, in the inner surface of the detector housing 164. The other end of the rotary shaft 178 extends through a clearance hole 182 in a partition 184 between the radiation sensor chamber 166 and the angle sensor chamber 170 and is coupled to an angle sensor 186 snugly mounted in the angle sensor chamber 170. The rotary shaft 178 rotates bidirectionally with the oscillation of the road sensor casing 174, thereby transmitting the oscillation of the road sensor 172 to the angle sensor 186. The angle sensor 186, which may take the form of an optical rotary encoder in practice, functions to provide an electric signal indicative of the angle between the vehicle M and the direction of transmission of the radiation when the energy of the reflected radiation falling on the road sensor 172 is at a maximum. The angle sensor output signal is fed to the CPU 10, which will then compute the angle of the vehicle M with respect to the road surface 162.

Employed for the desired oscillation of the road sensor 172 is an electric motor 188 (hereinafter referred to as the road sensor motor) closely mounted in the motor chamber 168. The armature shaft 190 of the road sensor motor 188 is coupled to a crank web 192 which is received with clearance in a relatively large hole 194 defined in a partition 196 between the road sensor chamber 166 and the motor chamber 168. A crank pin 198 on the crank web 192 is slidably engaged in a groove 200 in the road sensor casing 174. Thus the rotation of the road sensor motor 188 is translated into the oscillation of the road sensor 172 through a preassigned angle about the rotary shaft 178 extending horizontally and longitudinally of the motorcycle M.

For the detection of the angle of the vehicle M with respect to the road surface 162 by this first form of vehicle inclination detector 12, the road sensor motor 188 may be set into rotation for swinging the road sensor casing 174. Simultaneously, the desired radiation such as infrared rays or ultrasonic wave may be emitted from the road sensor 172 for laterally (or diagonally since the vehicle is traveling) scanning the road surface 162, as indicated at 202 in FIGS. 11A and 11B. Being all directed more or less downwardly, such radiation 202 will be reflected by the road surface 162 as at 202'. The magnitude of the reflected radiation 202' received by the road sensor 172 during each stroke of its oscillation will be maximum when the radiation 202 is emitted at right angles with the road surface 162, and will drastically decrease when the radiation is emitted at other angles.

Let us suppose that the motorcycle M is now traveling with a lateral angle of 90 degrees to the road surface 162, which may be banked or unbanked, as in FIG. 11A, and that the radiation 202 has just been emitted at right angles with the road surface 162, as manifested by the maximum magnitude of the reflected radiation 202' falling on the road sensor 172. We can use the magnitude of the output signal of the angle sensor 186 at that moment as the reference value representative of the neutral position of the vehicle, by which we means the lateral vehicle position of 90 degrees to the road surface.

In FIG. 11B is shown the motorcycle M inclined with respect to the road surface 162. Then, naturally, the magnitude of the output signal of the angle sensor 186 at the moment the radiation 202 is transmitted at right angles with the road surface 162 will differ from that when the vehicle position is in neutral. Accordingly, as the electric outputs from the road sensor 172 and the angle sensor 186 are both fed to the CPU 10, the latter can compute the angle and direction of inclination of the vehicle with respect to the road surface.

6-2. Second Form of Vehicle Inclination Detector

Figure 15:
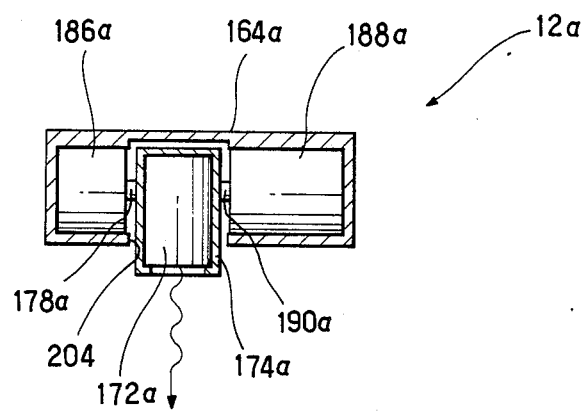
FIG. 15 is a vertical section through a modified vehicle inclination detector in accordance with our invention.

FIG. 15 shows the second preferred form of vehicle inclination detector 12a. It has a detector housing 164a of generally cylindrical shape to be mounted to the motorcycle frame 160 with its axis oriented horizontally and longitudinally of the vehicle. While the opposing ends of the detector housing 164a are closed, a relatively wide slot 204 is formed in all but the top portion of its circumference in a position intermediate the opposite ends.

Closely mounted within the detector housing 164a are an angle sensor 186a and a road sensor motor 188a in coaxial relation to each other. A road sensor 172a with its open bottom casing 174a is disposed between the angle sensor 186a and the road sensor motor 188a and so is largely exposed through the slot 204. The road sensor casing 174a is pivotally supported by and between the rotor shaft 178a of the angle sensor 186a and the armature shaft 190a of the road sensor motor 188a.

The road sensor 172a of this vehicle inclination detector 12a can be of the same construction as the road sensor 172 of the previously disclosed detector 12. However, being coupled directly to the road sensor casing 174a, the road sensor motor 188a must be reversible for swinging the road sensor 172a. We believe that the other details of construction and operation are self evident from the foregoing description of the vehicle inclination detector 12.

6-3. Third Form of Vehicle Inclination Detector

Figure 16:
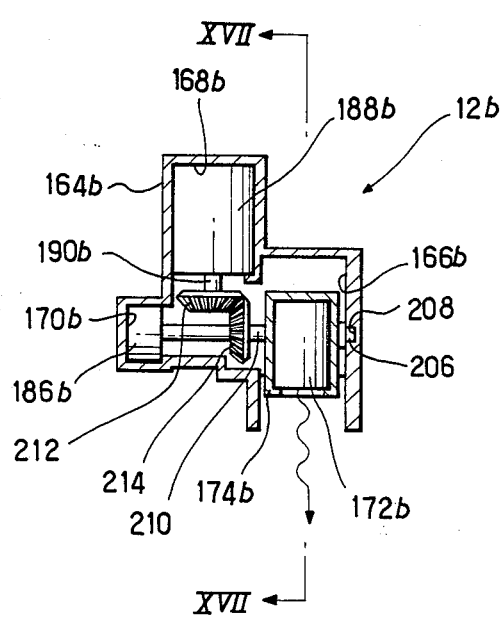
FIG. 16 is a vertical section through another modified vehicle inclination detector in accordance with our invention.
Figure 17:
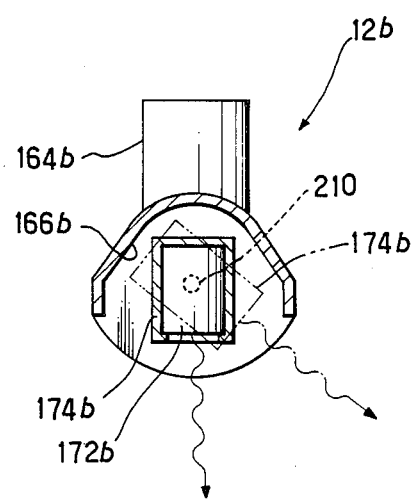
FIG. 17 is a section through the vehicle inclination detector of FIG. 16, the section being taken along the line XVII—XVII in FIG. 16.

With reference to FIGS. 16 and 17 the third preferred form of vehicle inclination detector 12b has a detector housing 164b configured to provide a road sensor chamber 166b, a motor chamber 168b and an angle sensor chamber 170b. The road sensor chamber 166b is of substantially the same shape as the road sensor chamber 166 of the vehicle inclination detector 12, as will be understood from a comparison of FIGS. 12 and 17. A road sensor 172b with its open bottom casing 174b is received with clearance in this chamber 166b. A short shaft or pivot pin 206 extends radially from the road sensor casing 174b and is rotatably journaled in a bearing hole 208 in the detector housing 164b. Another shaft 210 extends from the road sensor casing 174b in collinear relation to the shaft 206 and is drivingly coupled to an angle sensor 186b immovably mounted in the angle sensor chamber 170b. The road sensor 172b oscillates about the common axis of the shaft 206 and 210 extending longitudinally of the vehicle.

Closely mounted in the motor chamber 168b is a reversible road sensor motor 188b having a shaft 190b terminating in a bevel gear 212. This bevel gear meshes with another bevel gear 214 on the shaft 210 between road sensor casing 174b and angle sensor 186b.

This third form of vehicle inclination detector 12b differs from the two preceding forms 12 and 12a principally in that the road sensor motor 168b is coupled to the road sensor 172b via the bevel gearing 212 and 214. The road sensor motor 168b may be alternately excited in opposite directions for oscillating the road sensor 172b, as in the second form of vehicle inclination detector 12a. The other details of construction and operation are as previously set forth in conjunction with the first form of vehicle inclination detector 12.

7. Electric Circuitry

7-1. General

Figure 18:
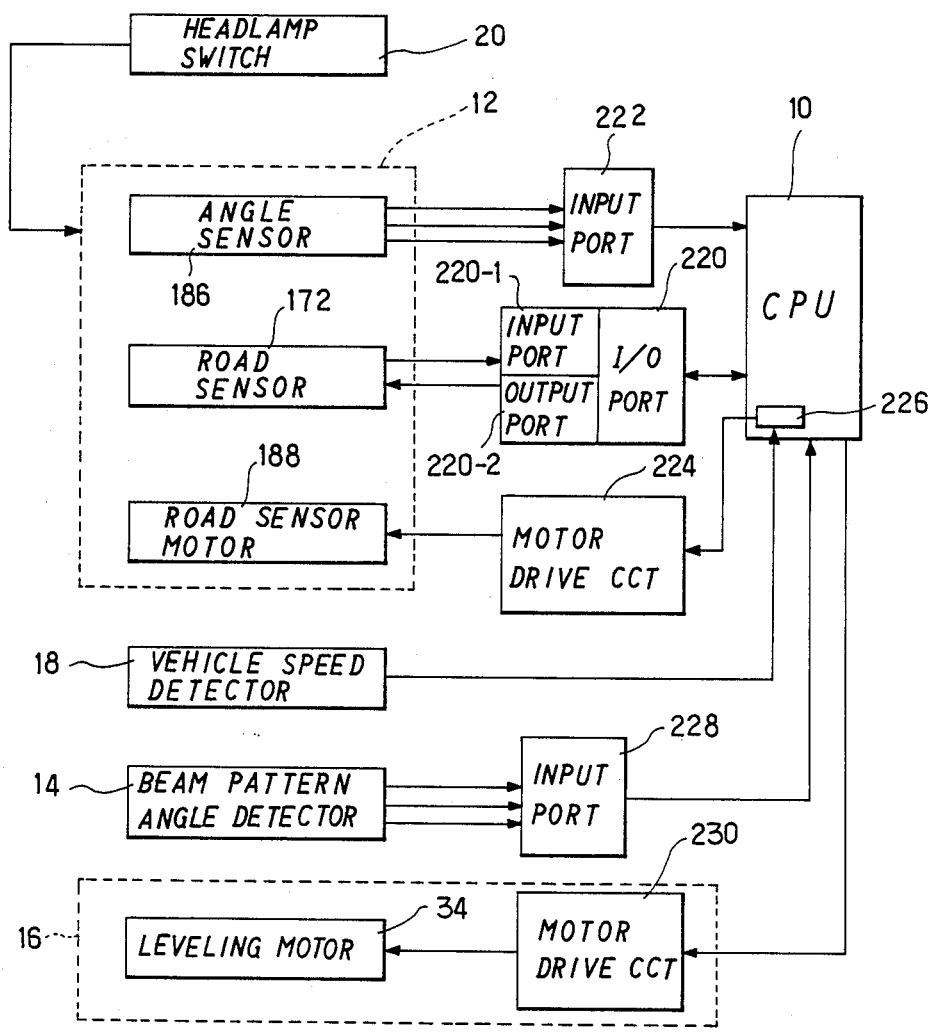
FIG. 18 is a block diagram of the general electrical configuration of the beam pattern leveling headlamp system in accordance with our invention.

Reference is directed to FIG. 18, which is a more detailed representation of the block diagram of FIG. 1, for a study of the general configuration of the electric circuitry of the beam pattern leveling system for use with the motorcycle headlamp assembly 22 of FIGS. 1–4. Electrically, as is apparent from the foregoing description of FIGS. 12–14, the vehicle inclination detector 12 is comprised of the road sensor 172, angle sensor 186 and road sensor motor 188. The road sensor 172 and the angle sensor 186 are both connected to the CPU 10 via input/output ports 220 and 222, respectively. In the case where an ultrasonic sensor is employed as the road sensor 172, two signal lines are required for connection of the ultrasonic sensor to each of the input ports 220-1 and 220-2 of the input/output port 220. Also, if an optical rotary encoder is employed as the angle sensor 186, three signal lines are required as shown.

The road sensor motor 188 is connected to a drive circuit 224 thereby to be controllably excited. The motor drive circuit 224 is connected in turn to the CPU 10, which controls the circuit 224 via an internal resistor 226. The vehicle speed detector 18, which we have not disclosed in detail because of its conventional nature, is also connected to the internal resistor 226 of the CPU 10. Accordingly, the road sensor motor 188 may be so excited as to oscillate the road sensor 172 at a rate suiting the traveling speed of the motorcycle. The road scanning rate of the road sensor 172 should be made higher in proportion with the traveling speed of the vehicle.

The beam pattern angle sensor 158 of the beam pattern angle detector 14 is connected to the CPU 10 via an input port 228. The leveling motor 34 of the beam pattern leveling mechanism 16 is connected to the CPU 10 via a motor drive circuit 230.

The complete beam pattern leveling system will be set into operation when the headlamp switch 20 is activated to light up the bulb 26 of the headlamp assembly 22. The CPU 10 will then be reset, and its data area initialized. As the vehicle runs, the road sensor 172, angle sensor 186, vehicle speed sensor 18 and beam pattern angle sensor 158 will deliver the required data to the CPU 10. We understand that the CPU 10 is preprogrammed to sequentially process the incoming data and to produce the necessary control data for delivery to the road sensor 172, road sensor motor drive circuit 224 and leveling motor drive circuit 230 for the desired operation of the beam pattern leveling system.

7-2. Road Sensor Circuit

Figure 19:
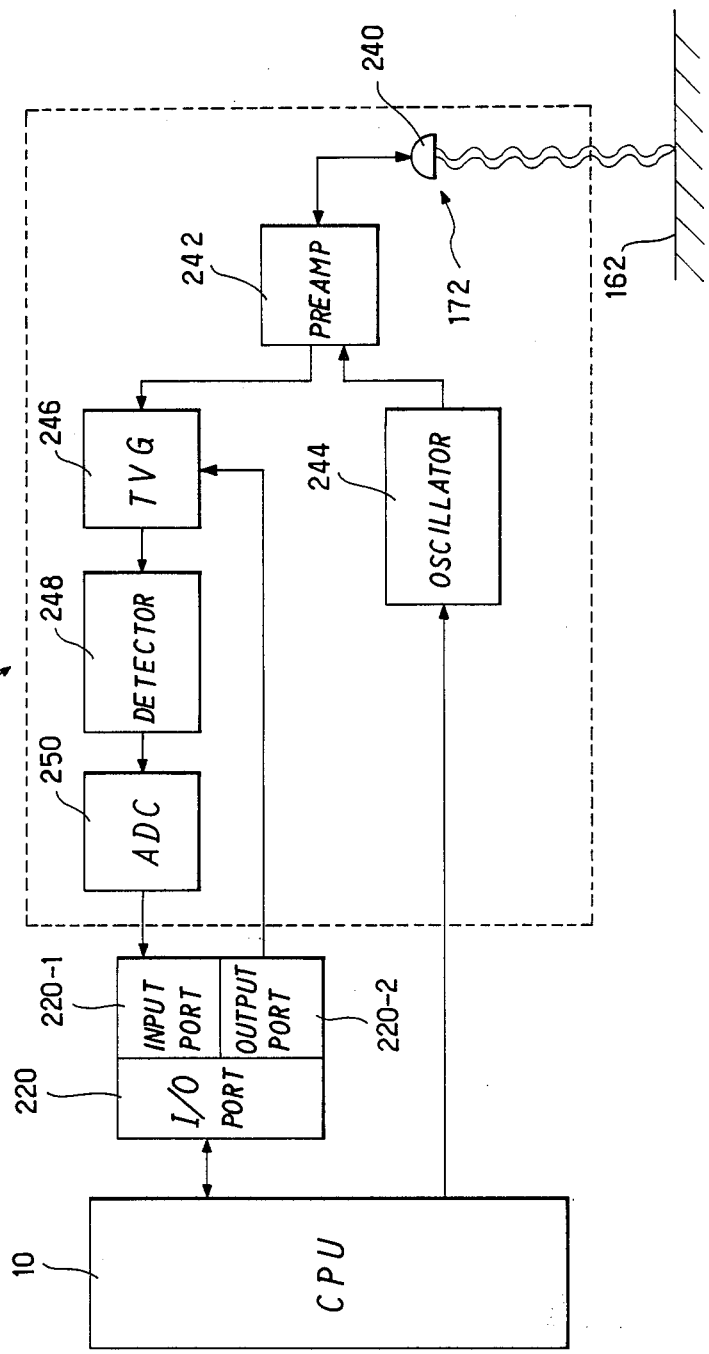
FIG. 19 is a block diagram showing in more detail the electric circuitry associated with the road sensor used in any of the three different forms of the vehicle inclination detector shown in FIGS. 12-17.

We have said that the road sensor 172, 172a or 172b can be either an ultrasonic sensor or an infrared sensor. If an ultrasonic road sensor is employed, the associated electric circuit may be as illustrated block diagrammatically in FIG. 19. The reference numeral 239 generally denotes the ultrasonic sensor circuit including a combined ultrasonic transmitter/receiver 240 capable of emitting an ultrasonic pulse signal and receiving the ultrasonic echo returned from the road surface 162. A preamplifier circuit 242 is connected to the transmitter/receiver 240 for amplifying the electric output therefrom. An oscillator circuit 244 is connected between the CPU 10 and the preamplifier 242. In response to each clock pulse from the CPU 10, the oscillator circuit 244 generates a series of pulses at a prescribed ultrasonic frequency for delivery to the preamplifier circuit 242. Thus the preamplifier circuit 242 serves the additional purpose of amplifying the oscillator output preparatory to delivery to the ultrasonic transmitter/receiver 240.

The preamplifier circuit 242 has an output connected to a time variable gain (TVG) circuit 246. Having an additional input connected to the output port 220-2 of the CPU 10, the TVG circuit 246 functions to eliminate from the preamplifier output any reverberation noise that may occur as a result of the vibration of the road sensor casing 174 seen in FIGS. 12–14. A detector circuit 248 is connected to the TVG circuit 246 for extracting the useful intelligence from its output, removing the carrier wave and filtering out any low frequency noise that may be caused as by vehicle vibration. An analog to digital converter (ADC) 250 is connected to the output of the detector circuit 248 for digitizing that part of the detector output which is above a predetermined level, prior to delivery to the CPU 10 via the input port 220-1.

Figure 20:
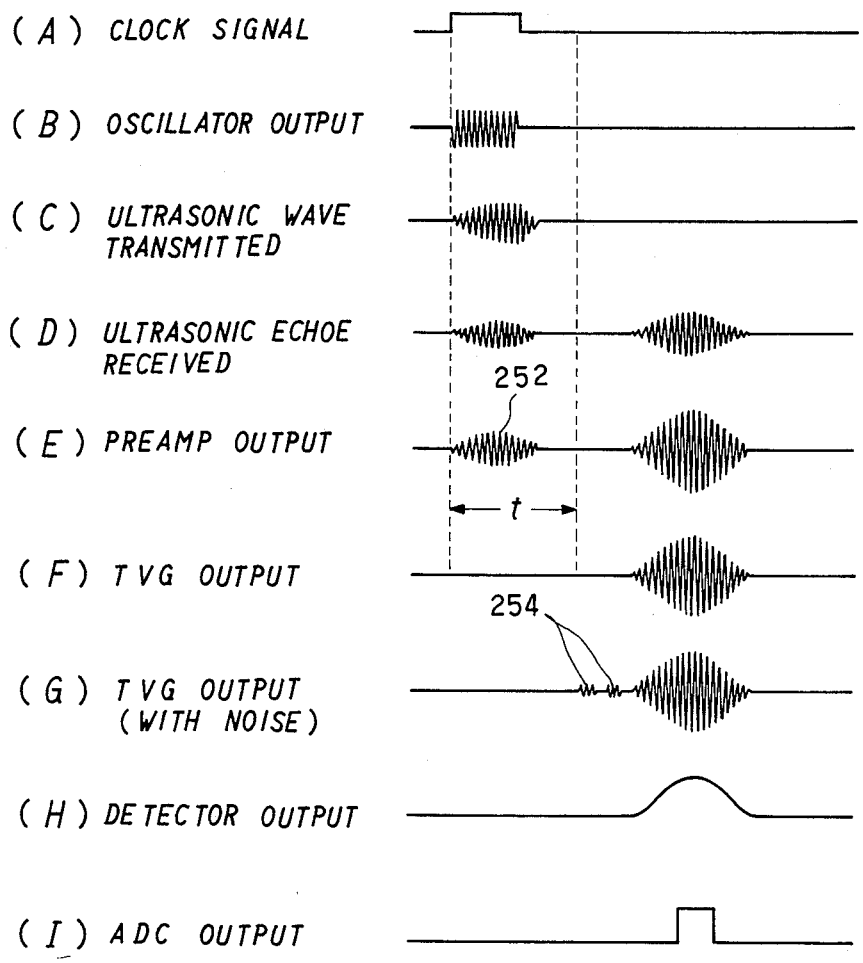
FIG. 20 is a diagram of waveforms appearing in the various parts of the road sensor circuitry of FIG. 19, the waveforms being useful in explaining the operation of the road sensor circuitry.

The operation of the ultrasonic road sensor circuit 239 will be better understood by referring to FIG. 20 which shows the waveforms appearing in the various parts of the circuit 172 in time relation to one another. In response to each clock pulse, shown at (A) in FIG. 20, from the CPU 10 the oscillator circuit 244 will deliver a series of ultrasonic frequency pulses (B) to the preamplifier circuit 242. The amplified ultrasonic frequency pulses will be fed to the ultrasonic transmitter/receiver 240, causing the same to emit an ultrasonic wave (C). The transmitter/receiver 240 will receive the ultrasonic echoe (D) from the road surface 162, provided, of course, that the ultrasonic road sensor 172 is oriented more or less at right angles with the road surface. The preamplifier circuit 242 again will amplify the received ultrasonic echoe.

As indicated at (E) in FIG. 20, the output from the preamplifier circuit 242 may contain reverberation noise 252. For the removal of the reverberation noise the CPU 10 is preprogrammed to inhibit signal transmission through the TVG circuit 246 for a preassigned time t after the leading edge of each clock pulse. The resulting output from the TVG circuit 246 may be as shown at (F) or (G) in FIG. 20. Possibly, as will be noted from FIG. 20(G), the output from the TVG circuit 246 may still contain low frequency noise 254 due to vehicle vibration. The detector circuit 248 will remove such low frequency noise, as well as the signal carrier, from the output from the TVG circuit 246. The resulting output (H) from the detector circuit 248 will be subsequently digitized by the ADC 250. The digital output (I) from the ADC 250 will be fed to the CPU10.

7-3. Beam Pattern Leveling Motor Circuit

FIG. 21 shows an electric circuit 260 for controllably driving the leveling motor 34 of the beam pattern leveling mechanism seen at 16 in FIGS. 4 and 5. The leveling motor circuit 260 includes a sensing control circuit 262 for controlling the speed of the leveling motor 34 under the control of the CPU 10. A comparator 264 has its two outputs connected respectively to the CPU 10 and to the sensing control circuit 262 for comparing the outputs therefrom. A signal separator 266 separates the comparator output into positive and negative signals. If the comparator output is positive, the signal separator 266 will direct it to the noninverting input of a comparator 268; if negative, the comparator output will be directed to the noninverting input of another comparator 270. Connected to the inverting inputs of the two comparators 268 and 270 is a sawtooth generator 272 from which there is supplied a sawtooth signal of a prescribed frequency. The comparators 268 and 270 will compare the signal separator outputs with the sawtooth signal and deliver the resulting outputs to the bases of transistors 274 and 276, respectively.

The transistors 274 and 276 are coupled to a motor excitation circuit comprising a power supply 278 and a differential amplifier 280 having four transistors 282. Thus, with the selective actuation of the transistors 274 and 276, the leveling motor 34 will rotate in either of two opposite directions for driving the bulb 26 and control lens 30, FIGS. 4 and 5, about the lamp axis x—x and hence for leveling the beam pattern. The sensing control circuit 262 operates under CPU control for matching the speed of the leveling motor 34 to the traveling speed of the vehicle, the CPU 10 being connected to the vehicle speed detector 18 as in FIG. 18.

7-4. Angle Sensor Circuit

FIG. 22 shows an electric circuit 290 associated with the angle sensor 186, 186a or 186b of the vehicle inclination detector 12, 12a or 12b, on the assumption that the angle sensor takes the form of an optical incremental rotary encoder by way of example only. The angle sensor circuit 290 has three light emitting diodes (LEDs) 292-1, 292-2 and 292-3 arranged to irradiate three phototransistors 294-1, 294-2 and 294-3, respectively, through an apertured screen 296 capable of oscillation with the road sensor 172, 172a or 172b. When irradiated, the phototransistors will deliver their outputs to respective amplifiers 298-1, 298-2 and 298-3 and thence to respective Schmitt circuits 300-1, 300-2 and 300-3. When the input voltages exceed a preset value, the Shmitt circuits provide pulses of constant amplitude at output terminals 302-1, 302-2 and 302-3. The first two output terminal 302-1 and 302-2 provide pulses indicative of the rightward displacement and leftward displacement, respectively, of the screen 296. By the words "rightward" and "leftward" we mean the right and left directions, respectively, of the vehicle as seen from the vehicle rider. The third output terminal 302-3 provides a pulse only when the screen 296 is in the neutral position.

Figure 23:
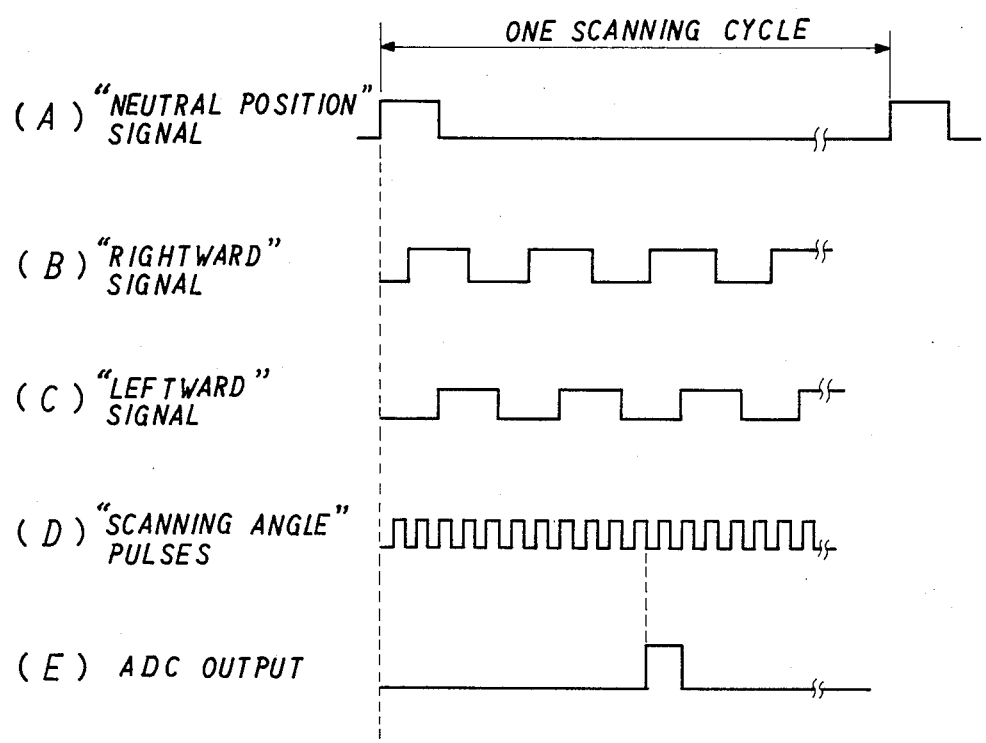
FIG. 23 is a waveform diagram showing signals useful in explaining how the direction and angle of lateral tipping of the vehicle are ascertained from the output signals of the angle sensor circuitry of FIG. 22 and the road sensor circuitry of FIG. 19.

Reference is invited to the waveform diagram of FIG. 23 for a better understanding of the operation of the angle sensor circuit 290. At (A) in FIG. 23 are shown the "neutral position" pulses obtained at the third output terminal 302-3 of the angle sensor circuit 290 with the oscillation of the road sensor 172, 172a or 172b by the rotation of the road sensor motor 188, 188a or 188b. The repetition rate of these "neutral position" pulses represents the scanning cycle of the road sensor 172, 172a or 172b. The ADC 250, FIG. 19, of the ultrasonic sensor circuit 239 will deliver one pulse, representative of the detected reflection of the radiation, to the CPU 10 during each such scanning cycle, as at (E) in FIG. 23.

As will be seen from (B) and (C) in FIG. 23, the first and second output terminals 302-1 and 302-2 of the angle sensor circuit 290 will provide two series of pulses with a phase difference therebetween. This phase difference is a token of the angular orientation of the road sensor 172, 172a or 172b. If the phase of the "rightward" pulses of FIG. 23(B) leads that of the "leftward" pulses of FIG. 23(C), the road sensor is oriented rightwardly; if otherwise, the road sensor is orinted leftwardly.

It is also important that the angle of inclination of the road sensor 172, 172a or 172in either direction be ascertained at the exact moment the CPU 10 inputs each output pulse from the ADC 250 of the ultrasonic sensor circuit 239. Such an angle is detectable from the "neutral position" pulses of FIG. 23(A), a series of "scanning angle" pulses of FIG. 23(D) from the CPU 10, and each ADC output pulse of FIG. 23(E). As indicated by the dashed lines in FIG. 23, the "scanning angle" pulses may be counted from the moment of the rise of each "neutral position" pulse to the moment of the rise of the subsequent ADC output pulse. The resulting count represents the angle of inclination of the road sensor 172, 172a or 172b in either direction.

8. First Alternative Means for Vehicle Inclination Detection

Figure 24:
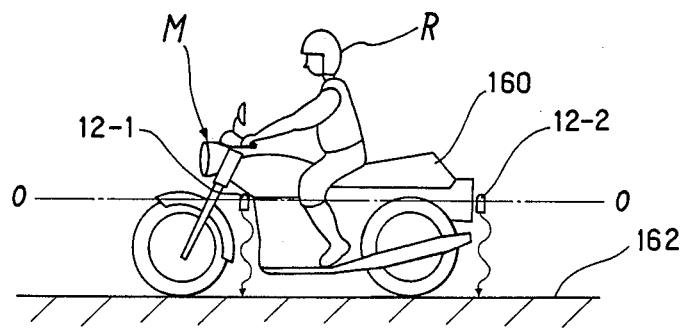
FIG. 24 is a side elevation of a motorcycle, shown together with a rider thereon, having a pair of vehicle inclination detectors mounted thereto as an alternative means for detecting the lateral tipping of the vehicle with respect to the road surface.

As will be seen by referring back to FIGS. 11A and 11B, the preceding embodiment of our invention has but one vehicle inclination detector 12 (or 12a or 12b) mounted to the vehicle frame 160 for laterally scanning the road surface 162 on both sides of the motorcycle M. As illustrated in FIG. 24, this alternative embodiment differs from the preceding embodiment in that two vehicle inclination detectors 12-1 and 12-2 are mounted to the motorcycle frame 160 with a spacing therebetween in the front to rear longitudinal direction of the motorcycle M. Further the vehicle inclination detectors 12-1 and 12-2 are both on a horizontal line 0—0 contained in the median plane of the vehicle. We have designated the two vehicle inclination detectors 12-1 and 12-2 for the convenience of disclosure, even though they can be of like construction, and any of the foregoing disclosed detector constructions 12, 12a and 12b is adoptable for each such detector.

Figure 25:
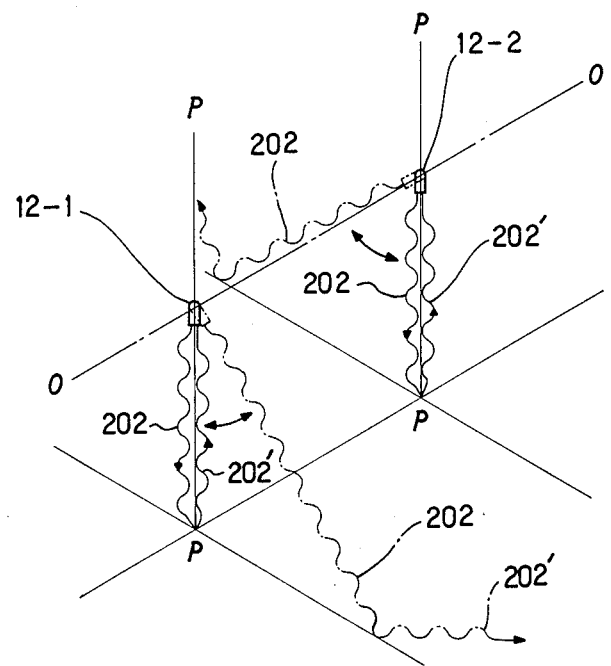
FIG. 25 is a schematic illustration of how the pair of vehicle inclination detectors of FIG. 24 scan the road surface for the detection of lateral vehicle inclination.

FIG. 25 is explanatory of the method of vehicle inclination detection by the detector arrangement of FIG. 24. Each of the two vehicle inclination detectors 12-1 and 12-2 need not scan both sides of the vehicle M; instead, for example, the front detector 12-1 may scan the left hand side of the vehicle, as seen from the vehicle rider R, whereas the rear detector 12-2 may scan the right hand side of the vehicle. As the two detectors 12-1 and 12-2 can operate concurrently, it becomes possible to scan the complete required road surface area in a much shorter time than if it is covered by one detector as in the foregoing embodiment. The mutual interference of the detectors 12-1 and 12-2 is avoidable by differing their transmission frequencies.

Figure 26:
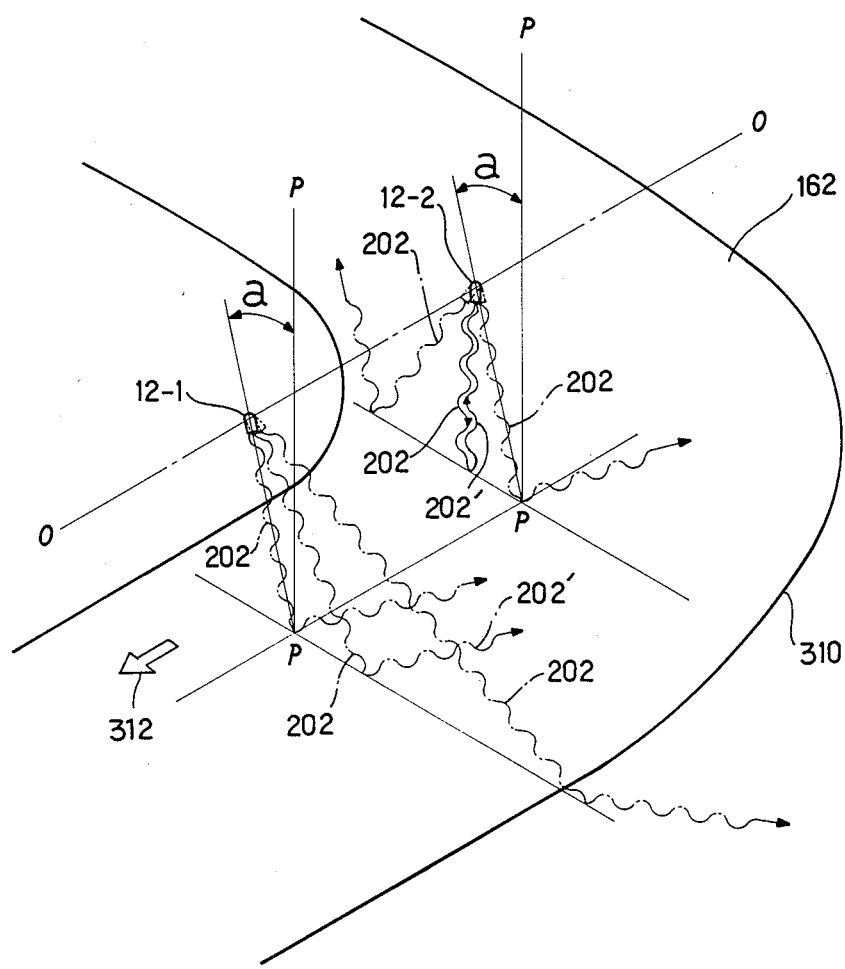
FIG. 26 is a schematic illustration of how the pair of vehicle inclination detectors of FIG. 24 detects the lateral tipping of the vehicle when it is rounding a rightward curve.

Let us suppose that, as illustrated in FIG. 26, the motorcycle M with the two inclination detectors 12-1 and 12-2 thereon is now taking a curve 310 in the direction of the arrow 312. The vehicle will then tilt to the right through a certain angle a with respect to the plane of the perpendicular indicated by the capital P. When the vehicle is so rounding the curve 310, the front vehicle inclination detector 12-1 will receive no reflection 202' of the transmitted radiation 202 from the road surface 162, provided that the curve 310 is not too steeply banked. The rear vehicle inclination detector 12-2, on the other hand, will receive the reflection 202' from the road surface 162. Thus, arranged as shown in FIG. 24, the two vehicle inclination detectors 12-1 and 12-2 coact to enable the detection of the direction and angle of vehicle tipping.

Incidentally, if the vehicle stays out of the perpendicular for a certain length of time, the signals fed from the vehicle inclination detector or detectors to the CPU will repeatedly indicate the tipping of the vehicle. The CPU may therefore be programmed not to activate the beam pattern leveling mechanism until the detector output signals repeat such indication of vehicle tipping a prescribed number of times, thereby avoiding unnecessary readjustment of the beam pattern as during the frequent zigzagging of the vehicle.

9. Second Alternative Means for Vehicle Inclination Detection

Figure 27:
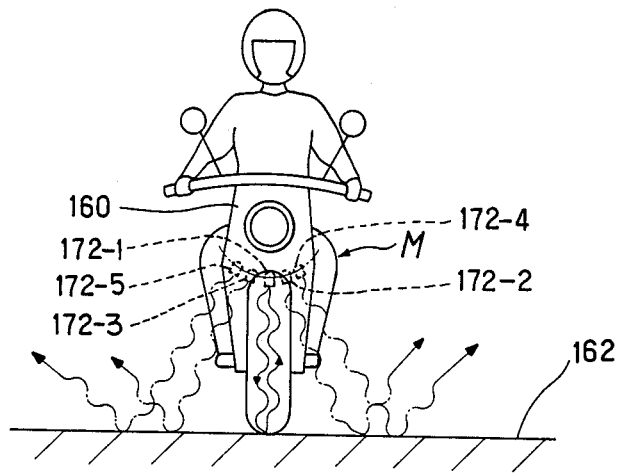
FIG. 27 is a front elevation of a motorcycle, shown together with a rider thereon, having a plurality of road sensors mounted thereto as a second alternative means for detecting the lateral tipping of the vehicle with respect to the road surface, the view being explanatory of the arrangement of the road sensors as seen from the front of the motorcycle.

Our invention also permits the detection of the direction and angle of vehicle inclination by a plurality of road sensors, akin to those shown at 172, 172a and 172b in FIGS. 12–17, rather than by the vehicle inclination detectors 12, 12a or 12b as in the foregoing embodiments. An inspection of FIGS. 27 and 28 will reveal a necessary arrangement of such a set of road sensors on the motorcycle M. We have employed in this particular embodiment five road sensors designated 172-1, 172-2, 172-3, 172-4 and 172-5. FIG. 27 indicates that, as seen from the front of the vehicle as in FIG. 27, the five road sensors are arranged at constant angular spacings on a notional arc centered about an axis that is displaced upwardly therefrom and that is contained in the median plane of the vehicle. All the road sensors 172-1 to 172-5 are immovable with respect to the vehicle frame 160 and are oriented radially outwardly of the notional arc; that is, the road sensors need not oscillate as in the foregoing embodiments. It will also be observed from FIG. 27 that the centrally located road sensor 172-1 lies in the median plane of the vehicle, and that the other four road sensors 172-2 to 172-5 are in positions of bilateral symmetry with respect to the median plane, as seen from the front of the vehicle.

Figure 28:
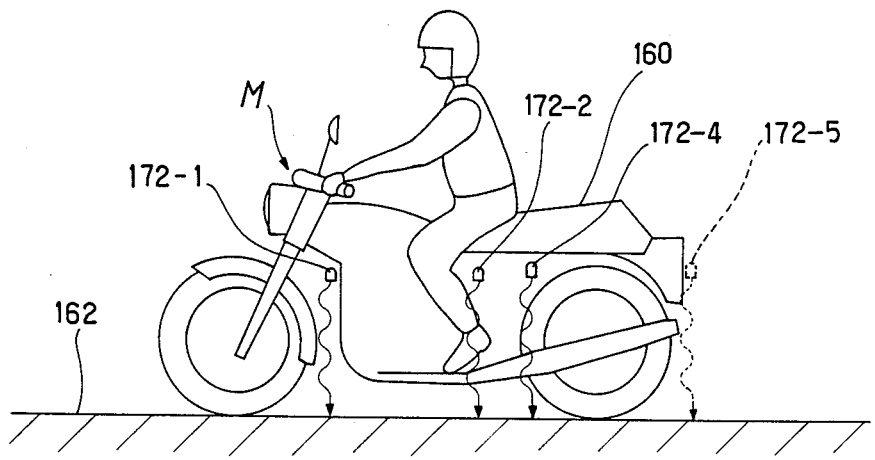
FIG. 28 is a side elevation of the motorcycle of FIG. 27, the view being explanatory of the arrangement of the road sensors as seen from the side of the vehicle.

Preferably, as seen from either side of the motorcycle M as in FIG. 28, the five road sensors 172-1 to 172-5 are disposed with spacings in the longitudinal direction of the vehicle and arranged in the order of 172-1, 172-2, 172-3, 172-4 and 172-5 from the front to the rear of the vehicle. The illustrated arrangement makes it unnecessary to differ the transmission frequency of the road sensors for the avoidance of mutual interference.

Figure 29:
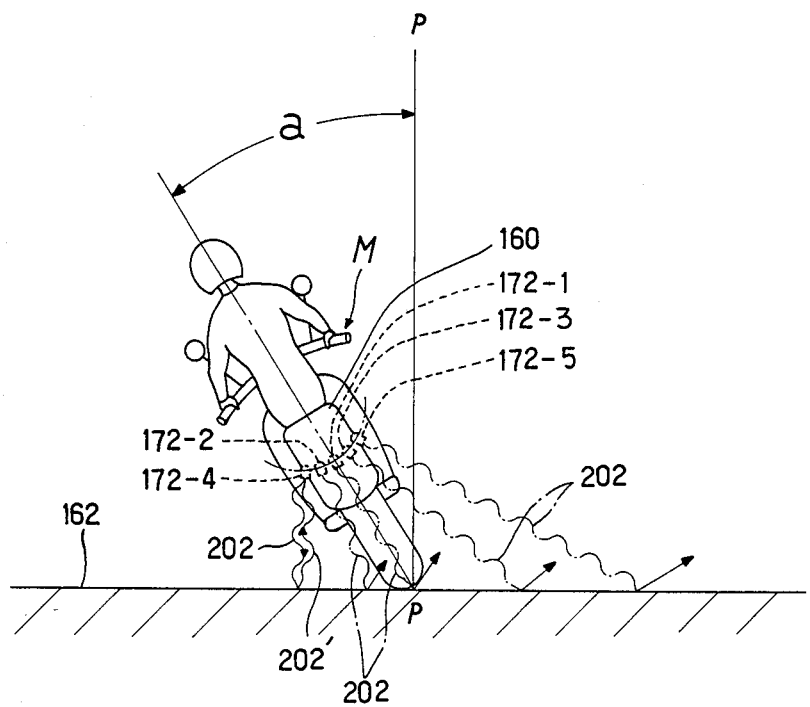
FIG. 29 is a rear elevation of the motorcycle of FIGS. 27 and 28, the vehicle being shown inclined in order to explain how such vehicle inclination is detected by the road sensors.

The manner of vehicle inclination detection by the road sensors 172-1 to 172-5 will become apparent from a study of FIG. 29, in which the motorcycle M is shown slanting to the left through an angle a with respect to the perpendicular P—P. The angle a is such that only the leftmost road sensor 172-4 receives the reflection 202' of the radiation 202 from the road surface 162, being oriented at right angles therewith. All the other road sensors 172-1 to 172-3 and 172-5 are now at angles to the road surface 162 and so fail to receive the reflections of the radiations they transmitted. The direction and approximate angle of vehicle tipping can thus be ascertained on the basis of which one of the five road sensors receives the radiation reflected from the road surface. Of course, for the detection of more exact vehicle angles, a greater number of road sensors may be mounted to the vehicle in accordance with the teachings of FIGS. 27 and 28.

A pronounced advantage of the FIGS. 27–29 embodiment is that the road sensors can be mounted to the motorcycle in fixed relation to its frame, it being unnecessary for the sensors to oscillate for scanning the road surface. The fixed road sensors will well withstand the most violent vibration of the vehicle, assuring trouble-free operation over an extended period of time.

As desired, an additional road sensor may be mounted to the rearmost part of the motorcycle M, as indicated by the phantom outline designated 172-5 in FIG. 28. The rearmost road sensor 172-5 should be on a level with the foremost road sensor 172-1. The distances between these two road sensors 172-1 and 172-5 and the road surface 162 may be measured as by the time required for the transmission and reception of the radiation or by the number of pulses counted during such time. A difference, if any, between the two distances represents the angle of tipping of the vehicle in its longitudinal direction, so that the vertical aiming angle of the headlamp assembly may be readjusted accordingly.

Despite the foregoing detailed disclosure we do not wish out invention to be limited by the specific details of the illustrated embodiments. Various modifications may be made to conform to design preferences or the requirements of specific applications of the invention without departing from the fair meaning or proper scope of the appended claims.

We claim:

1. A beam pattern leveling headlamp system for use on a motorcycle or like vehicle that is subject to lateral tipping as when taking a curve, the headlamp system comprising:
   (a) a headlamp unit on a vehicle for throwing a light beam having a prescribed beam pattern, the headlamp unit having a lamp axis and being capable of angularly displacing the beam pattern about the lamp axis;
   (b) beam pattern leveling means acting on the headlamp unit for causing the same to angularly displace the beam pattern about the lamp axis;
   (c) vehicle inclination detector means sensitive to a road surface on which the vehicle is traveling, for detecting the degree of lateral tipping of the vehicle with respect to the road surface;
   (d) control means responsive to the vehicle inclination detector means for actuating the beam pattern leveling means so as to cause the head lamp unit to angularly displace the beam pattern about the lamp axis to an extent necessary for leveling the beam pattern with respect to the road surface in the face of the lateral tipping of the vehicle thereon;
   (e) whereby the beam can always be maintained in the level position with respect to the road surface regardless of whether the road is banked or unbanked.

2. The beam pattern leveling headlamp system of claim 1 wherein the headlamp unit comprises:

(a) housing means;

(b) a reflector within the housing means;

(c) a light source positioned within the reflector for rotation relative to the housing means about the lamp axis; and (d) a control lens positioned within the housing means and coupled to the light source for joint rotation therewith;

(e) the beam pattern being angularly displaced about the lamp axis by the joint rotation of the light source and the control lens relative to the housing means about the lamp axis.

3. The beam pattern leveling headlamp system of claim 2 wherein the beam pattern leveling means comprises:

(a) a bidirectional actuator within the housing means; and (b) a drive linkage connecting the bidirectional actuator to the interconnected light source and control lens for bidirectionally rotating the same about the lamp axis.

4. The beam pattern leveling headlamp system of claim 1 wherein the vehicle inclination detector means comprises a road sensor for sensing the tipping of the vehicle with respect to the road surface by transmitting radiation toward the road surface and receiving the reflection of the radiation from the road surface.

5. The beam pattern leveling headlamp system of claim 1 wherein the vehicle inclination detector means comprises:

(a) a road sensor for detecting the direction of lateral tipping of the vehicle with respect to the road surface by transmitting radiation toward the road surface and by receiving the reflection of the radiation from the road surface, the road sensor being mounted to the vehicle and being capable of oscillation relative to the same about a horizontal axis extending in the traveling direction of the vehicle for laterally scanning the road surface with the radiation; and (b) an angle sensor mechanically coupled to the road sensor and responsive to the oscillation of the road sensor for detecting the angle of lateral tipping of the vehicle in either direction with respect to the road surface;

(c) the control means being responsive to signals from the road sensor and the angle sensor for actuating the beam pattern leveling means accordingly.

6. The beam pattern leveling headlamp system of claim 5 further comprising:

(a) variable speed actuator means for oscillating the road sensor about the horizontal axis; and (b) a vehicle speed detector for detecting the traveling speed of the vehicle;

(c) the control means being coupled both to the vehicle speed detector and to the variable speed actuator means for causing the latter to oscillate the road sensor at a speed matching the traveling speed of the vehicle.

7. The beam pattern leveling headlamp system of claim 1 wherein the vehicle inclination detector means comprises:

(a) a detector housing fixedly mounted to the vehicle;

(b) an angle sensor positioned within the detector housing for detecting the angle of tipping of the vehicle in either of the opposite lateral directions, the angle sensor having a rotary shaft extending therefrom for rotation about a horizontal axis extending in the traveling direction of the vehicle;

(c) a road sensor fixedly mounted to the rotary shaft within the detector housing for detecting the direction of lateral tipping of the vehicle by transmitting radiation toward the road surface and by receiving the reflection of the radiation from the road surface, the road sensor being capable of oscillation, with the consequent bidirectional rotation of the rotary shaft, relative to the detector housing for laterally scanning the road surface with the radiation;

(d) a rotary actuator within the detector housing; and (e) means within the detector housing for translating the rotation of the rotary actuator into the oscillation of the road sensor.

8. The beam pattern leveling headlamp system of claim 1 wherein the vehicle inclination detector means comprises:

(a) a detector housing fixedly mounted to the vehicle;

(b) an angle sensor positioned within the detector housing for detecting the angle of tipping of the vehicle in either of the opposite lateral directions with respect to the road surface, the angle sensor having a rotary shaft extending therefrom for rotation about a horizontal axis extending in the traveling direction of the vehicle;

(c) a bidirectional rotary actuator positioned within the detector housing and having an output shaft extending therefrom in coaxial relation to the rotary shaft extending from the angle sensor; and (d) a road sensor supported by and between the rotary shaft of the angle sensor and the output shaft of the rotary actuator within the detector housing for detecting the direction of lateral tipping of the vehicle with respect to the road surface by transmitting radiation toward the road surface and by receiving the reflection of the radiation from the road surface, the road sensor being oscillated, with the consequent bidirectional rotation of the rotary shaft, directly by the rotary actuator relative to the detector housing for laterally scanning the road surface with the radiation.

9. The beam pattern leveling headlamp system of claim 1 wherein the vehicle inclination detector means comprises:

(a) a detector housing fixedly mounted to the vehicle;

(b) an angle sensor positioned within the detector housing for detecting the angle of tipping of the vehicle in either of the opposite lateral directions with respect to the road surface, the angle sensor having a rotary shaft extending therefrom for rotation about a horizontal axis extending in the traveling direction of the vehicle;

(c) a road sensor fixedly mounted to the rotary shaft within the detector housing for detecting the direction of lateral tipping of the vehicle by transmitting radiation toward the road surface and by receiving the reflection of the radiation from the road surface, the road sensor being capable of oscillation, with the consequent bidirectional rotation of the rotary shaft, relative to the detector housing for laterally scanning the road surface with the radiation;

(d) a bidirectional rotary actuator within the detector housing; and (e) drive means within the detector housing for transmitting the bidirectional rotation of the rotary actuator to the road sensor for oscillating the same.

10. The beam pattern leveling headlamp system of claim 9 wherein the drive means comprises gear means connecting the bidirectional rotary actuator to the rotary shaft, so that the road sensor and the angle sensor are both driven directly by the rotary actuator.

11. The beam pattern leveling headlamp system of claim 1 wherein the vehicle inclination detector means comprises first and second vehicle inclination detectors mounted to the vehicle with a spacing therebetween in the traveling direction of the vehicle, the first vehicle inclination detector comprising:
  (a) a first road sensor for detecting the lateral tipping of the vehicle toward a first side thereof by transmitting radiation toward the road surface and by receiving the reflection of the radiation from the road surface, the first road sensor being mounted to the vehicle and being capable of oscillation relative to the same about a horizontal axis extending in the traveling direction of the vehicle for laterally scanning the first side of the road surface with the radiation; and
  (b) a first angle sensor mechanically coupled to the first road sensor and responsive to the oscillation of the first road sensor for detecting the angle of lateral tipping of the vehicle toward the first side thereof with respect to the road surface; the second vehicle inclination detector comprising:
  (c) a second road sensor for detecting the lateral tipping of the vehicle toward a second side thereof by transmitting radiation toward the road surface and by receiving the reflection of the radiation from the road surface, the second road sensor being mounted to the vehicle and being capable of oscillation relative to the same about a horizontal axis extending in the traveling direction of the vehicle for laterally scanning the second side of the road surface with the radiation; and
  (d) a second angle sensor mechanically coupled to the second road sensor and responsive to the oscillation of the second road sensor for detecting the angle of lateral tipping of the vehicle toward the second side thereof with respect to the road surface.

12. The beam pattern leveling headlamp system of claim 1 wherein the vehicle inclination detector means comprises a plurality of road sensors fixedly mounted to the vehicle and arranged radially, as seen from either end of the vehicle, with prescribed angular spacings therebetween for conjointly detecting the direction and angle of the lateral tipping of the vehicle with respect to the road surface by transmitting radiation toward the road surface and by receiving the reflections of the radiation from the road surface.

13. The beam pattern leveling headlamp system of claim 12 wherein the road sensors are spaced from one another in the traveling direction of the vehicle.

14. A beam pattern leveling headlamp system for use on a motorcycle or like vehicle that is subject to lateral tipping as when taking a curve, the headlamp system comprising:
  (a) a headlamp unit on a vehicle for throwing a light beam having a prescribed beam pattern, the headlamp unit having a lamp axis and being capable of angularly displacing the beam pattern about the lamp axis;
  (b) beam pattern leveling means acting on the headlamp unit for causing the same to angularly displace the beam pattern about the lamp axis;
  (c) beam pattern angle detector means for detecting the actual angle of the beam pattern about the lamp axis;
  (d) vehicle inclination detector means including at least one road sensor for detecting the direction and angle of lateral tipping of the vehicle with respect to a road surface on which the vehicle is traveling, the road sensor being capable of transmitting radiation toward the road surface and receiving the reflection of the radiation from the road surface; and
  (e) control means responsive to the beam pattern angle detector means and to the vehicle inclination means so as to cause the head lamp unit to angularly displace the beam pattern about the lamp axis in such a direction, and through such an angle, that the beam pattern remains level with respect to the road surface in the face of the lateral tipping of the vehicle regardless of whether the road is banked or unbanked.

15. A beam pattern leveling headlamp system for use on a motorcycle or like vehicle that is subject to lateral tipping as when taking a curve, the headlamp system comprising:
  (a) lamp housing means;
  (b) a reflector within the lamp housing means and centered about a lamp axis;
  (c) a light source coaxially positioned within the reflector for rotation relative to the lamp housing means about the lamp axis;
  (d) a control lens positioned within the lamp housing means and coupled to the light source for joint rotation therewith;
  (e) the reflector and the light source and the control lens coacting to emit a light beam having a prescribed beam pattern which is angularly displaceable about the lamp axis by the joint rotation of the light source and the control lens about the lamp axis;
  (f) beam pattern leveling means for bidirectionally revolving the light source and the control lens relative to the lamp housing means in order to cause angular displacement of the beam pattern about the lamp axis;
  (g) beam pattern angle detector means responsive to the rotation of the light source and the control lens for detecting the actual angle of the beam pattern about the lamp axis;
  (h) vehicle inclination detector means including at least one road sensor for detecting the direction and angle of lateral tipping of the vehicle with respect to a road surface on which the vehicle is traveling, the road sensor being capable of transmitting radiation toward the road surface and receiving the reflection of the radiation from the road surface; and
  (i) control means responsive to the beam pattern angle detector means and to the vehicle inclination detector means and to the vehicle inclination detector means for actuating the beam pattern leveling means so as to cause the same to revolve the light source and the control lens in such a direction, and through such an angle, that the beam pattern remains level with respect to the road surface in the face of the lateral tipping of the vehicle regardless of whether the road is banked or unbanked.

16. The beam pattern leveling headlamp system of claim 15 wherein the beam pattern leveling means comprises:

(a) a rotary member mounted within the lamp housing means for joint rotation with the light source and the control lens; and (b) a bidirectional rotary actuator mounted within the lamp housing means and drivingly coupled to the rotary member.

17. The beam pattern leveling headlamp system of claim 16 wherein the beam pattern angle detector means comprises a beam pattern angle sensor mounted within the lamp housing means and driven by the rotary member.

* * * * *

UNITED STATES PATENT AND TRADEMARK OFFICE
CERTIFICATE OF CORRECTION

PATENT NO. : 4,868,720
DATED : SEPTEMBER 19, 1989
INVENTOR(S) : MIYAUCHI ET AL.

It is certified that error appears in the above-identified patent and that said Letters Patent is hereby corrected as shown below:

Col. 22, line 17, before "means" insert --detector--; after "means" insert --for actuating the beam pattern leveling means--.

Col. 22, line 63, delete "and to the vehicle inclination detec- --;
        line 64, delete "tor means".

Signed and Sealed this

Thirtieth Day of October, 1990

*Attest:*

HARRY F. MANBECK, JR.

*Attesting Officer*      *Commissioner of Patents and Trademarks*